US012091025B2

(12) United States Patent
Kwon et al.

(10) Patent No.: US 12,091,025 B2
(45) Date of Patent: Sep. 17, 2024

(54) METHOD FOR COMBATING STOP-AND-GO WAVE PROBLEM USING DEEP REINFORCEMENT LEARNING BASED AUTONOMOUS VEHICLES, RECORDING MEDIUM AND DEVICE FOR PERFORMING THE METHOD

(71) Applicant: Foundation of Soongsil University-Industry Cooperation, Seoul (KR)

(72) Inventors: Minhae Kwon, Seoul (KR); Dongsu Lee, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 462 days.

(21) Appl. No.: 17/535,567

(22) Filed: Nov. 24, 2021

(65) Prior Publication Data

US 2022/0363279 A1 Nov. 17, 2022

(30) Foreign Application Priority Data

Apr. 21, 2021 (KR) .................. 10-2021-0051960
Jul. 13, 2021 (KR) .................. 10-2021-0091665

(51) Int. Cl.
*B60W 50/06* (2006.01)
*B60W 60/00* (2020.01)
*G06N 3/08* (2023.01)

(52) U.S. Cl.
CPC .......... *B60W 50/06* (2013.01); *B60W 60/001* (2020.02); *G06N 3/08* (2013.01)

(58) Field of Classification Search
None
See application file for complete search history.

(56) References Cited

U.S. PATENT DOCUMENTS 11,932,277 B2* 3/2024 Shalev-Shwartz .......................... B60W 60/001
2017/0038775 A1 2/2017 Park
(Continued)

FOREIGN PATENT DOCUMENTS

JP 6074553 B1 2/2017
JP 2018-062325 A 4/2018
(Continued)

OTHER PUBLICATIONS

English translation of CN-112700642-A (Author: Cui, T). (Year: 2021).*
(Continued)

*Primary Examiner* — James J Lee
*Assistant Examiner* — Jonathan E Reinert
(74) *Attorney, Agent, or Firm* — Stein IP, LLC

(57) ABSTRACT

A method for combating a stop-and-go wave problem using deep reinforcement learning based autonomous vehicles includes selecting one of a plurality of deep reinforcement learning algorithms for training an autonomous vehicle and a reward function in a roundabout environment in which autonomous vehicles and non-autonomous vehicles are driving, determining a deep neural network architecture according to the selected deep reinforcement learning algorithm, learning a policy which enables the autonomous vehicle to drive at a closest velocity to a constant velocity based on state information including a velocity of the autonomous vehicle and a relative velocity and a relative position between the autonomous vehicle and an observable vehicle by the autonomous vehicle at a preset time interval and reward information, using the selected deep reinforcement learning algorithm, and driving the autonomous vehicle based on the learned policy to determine an action of the autonomous vehicle.

15 Claims, 18 Drawing Sheets

(56) References Cited

U.S. PATENT DOCUMENTS

2018/0129205 A1     5/2018  Choi et al.
2020/0272159 A1*    8/2020  Zhang .................... G08G 1/22

FOREIGN PATENT DOCUMENTS

KR         10-1646134  B1    8/2016
KR      1020200040150  A     4/2020

OTHER PUBLICATIONS

Decision to Grant mailed Oct. 18, 2022, issued to corresponding Korean Application No. 10-2021-0091665.
Kang Minsoo et al., Deep Reinforcement Learning Based Velocity Control For Autonomous Vehicle in Circular Road, Proceedings of the Korea Telecommunications Society Conference, 2020, 11, pp. 400-401.
Korean Office Action mailed Jul. 25, 2022, issued to Korean Application No. 10-2021-0091665.

* cited by examiner

Algorithm 1 Deep reinforcement learning based acceleration control algorithm for autonomous vehicles

---

Input : Choose a type of algorithm to train the agent among PPO, DDPG and TD3
Output : network parameters $\Theta = [\Theta_{critic}, \Theta_{actor}]$
Require : total episode K, time step $T_E$ of an episode, soft update rate $\tau$, range of road length $[l_{min}, l_{max}]$, the number of vehicles on road N
if algorithm is TD3 then
    Set policy delay parameter $\Phi$
end if
Initialize network parameters $\Theta = [\Theta_{critic}, \Theta_{actor}]$
if algorithm is DDPG or TD3 then
    Initialize replay buffer with size B
    Initialize target network parameters $\Theta'$
end if
for episode k = 1, K do
    Initialize environment // randomly given road length $l$
    for t = 1, $T_E$ do
        Get state $s_{t,j}$
        Select $a_{t,j} \sim \pi_{\Theta_{actor}}(s_{t,j})$ // by actor network
        Execute action $a_{t,j}$ and compute reward $r_{t,j}$ and get new state $s_{t+1,j}$
        Store trajectory $<s_{t,j}, a_{t,j}, r_{t,j}, s_{t+1,j}>$
    Update critic network parameter $\Theta_{critic}$
    using gradient descent step :
$$\Theta_{critic} \leftarrow \Theta_{critic} + \alpha \nabla_{\Theta_{critic}} L$$
        if TD3 and t mod $\Phi$ or DDPG or PPO then
            Update actor network parameter $\Theta_{actor}$
            using gradient ascent step :
$$\Theta_{actor} \leftarrow \Theta_{actor} + \alpha \nabla_{\Theta_{actor}} L$$
            if TD3 or DDPG then
                Update target network parameters $\Theta'$
                using soft update : $\Theta' \leftarrow \tau\Theta + (1-\tau)\Theta'$
            end if
        end if
    end for
end for

METHOD FOR COMBATING STOP-AND-GO WAVE PROBLEM USING DEEP REINFORCEMENT LEARNING BASED AUTONOMOUS VEHICLES, RECORDING MEDIUM AND DEVICE FOR PERFORMING THE METHOD

CROSS-REFERENCE TO RELATED APPLICATION

This application claims priority under 35 U.S.C. § 119 to Korean Patent Application No. 10-2021-0051960 filed on Apr. 21, 2021, and Korean Patent Application No. 10-2021-0091665 filed on Jul. 13, 2021, the contents of which in their entirety are herein incorporated by reference.

BACKGROUND

1. Field

The present disclosure relates to a method for combating a stop-and-go wave problem using deep reinforcement learning based autonomous vehicles, and a recording medium and a device for performing the method, and more particularly, to improvements in traffic flows by mitigating stop-and-go waves that frequently occur in roundabouts using autonomous vehicles based on a variety of deep reinforcement learning algorithms for acceleration control policy learning.

2. Description of the Related Art

With the advancement of artificial intelligence technology, autonomous driving technology field is gaining attention as one of interesting topics to ordinary people and researchers. The Society of Automotive Engineers provides guidelines for categorizing the autonomous driving technology into six levels from level 0 to level 5: no automation, driver assistance, partial automation, conditional automation, high automation, and full automation.

Currently, numerous major companies successfully developed level 3 autonomous vehicles, and Waymo, GM, Hyundai-Kia, etc. are developing level 4 autonomous vehicles. Additionally, Korea first announced level 3 autonomous vehicle safety standards and allowed carmakers to launch and sell level 3 vehicles starting from July 2020. According to the paper reported by Korea Institute of S&T planning in 2019, level 4 autonomous vehicle market is projected to grow at an average annual growth rate of 84.2%, and level 3 autonomous vehicle market is projected to grow at an average annual growth rate of 33.6% from 2020 until 2035.

The elements of the autonomous driving technology are sensing technology, such as environment and location detection, planning technology (decision making technology), and controlling technology, as well as interfaces that provide information to drivers. When the three elements are completely learned, commercialization of fully automated vehicles is possible, and studies have been intensively made through deep learning that plays a key role in the development of artificial intelligence.

The autonomous driving technology has been studied by a pipeline approach of independently learning or implementing functional modules by roles and by an end-to-end approach of learning the entire process all at once. The pipeline approach through functional modularization usually includes perception, planning and action control modules, and each module is independently trained. In contrast, the end-to-end approach learns the entire autonomous driving process without functional modularization of the elements of the autonomous driving technology. The most typical learning method is reinforcement learning.

The reinforcement learning is a machine learning method which finds an optimal action through trial and error by agent-environment interactions. Deep reinforcement learning, which is the combination of reinforcement learning with deep learning, achieves optimal policy learning using a deep neural network even in a highly complex and uncertain environment. Accordingly, deep reinforcement learning is widely used in engineering problems of the complex real world such as autonomous driving technology.

Algorithms for deep reinforcement learning have been developed starting from Deep Q-Network (DQN) proposed by Google DeepMind. However, autonomous driving technology has only a few case studies for comparisons between algorithms using other state-of-the-art algorithms besides DQN. In particular, behavioral strategies may be differently learned depending on algorithms, and thus in the case of autonomous vehicles to which driving patterns are important, comparative research between algorithms are essential.

Meanwhile, in an environment in which there are numerous vehicles in a roundabout, when a specific vehicle slows down, vehicles following behind the vehicle slow down one after another by a reaction time delay. This may be the cause of a phantom traffic jam, which is a traffic jam occurring in the real road without any cause.

Additionally, due to the characteristics of the roundabout environment, when vehicles slow down on a side of the road, vehicles speed up on the opposite side. As a consequence, a phenomenon in which all the vehicles repeatedly stop and restart in an undulating pattern similar to waves by deceleration and acceleration is observed. This phenomenon is called stop-and-go wave.

A variety of algorithms from DON to state-of-the-art algorithms are applied to autonomous driving technology, but performance comparison of each algorithm is less studied. Additionally, most studies are aimed at constant driving in a specific road environment, and there are few studies for solving traffic congestion using autonomous vehicles.

SUMMARY

The present disclosure addresses this issue, and therefore the present disclosure is directed to providing a method for combating a stop-and-go wave problem using deep reinforcement learning based autonomous vehicles.

The present disclosure is further directed to providing a recording medium having stored thereon a computer program for performing the method for combating a stop-and-go wave problem using deep reinforcement learning based autonomous vehicles.

The present disclosure is further directed to providing a device for performing the method for combating a stop-and-go wave problem using deep reinforcement learning based autonomous vehicles.

A method for combating a stop-and-go wave problem using deep reinforcement learning based autonomous vehicles according to an embodiment for achieving the above-described object of the present disclosure includes selecting one of a plurality of deep reinforcement learning algorithms for training an autonomous vehicle and a reward function in a roundabout environment in which autonomous vehicles and non-autonomous vehicles are driving, determining a deep neural network architecture according to the selected deep reinforcement learning algorithm, learning a policy which enables the autonomous vehicle to drive at a closest velocity to a constant velocity based on state information including a velocity of the autonomous vehicle and a relative velocity and a relative position between the autonomous vehicle and an observable vehicle by the autonomous vehicle at a preset time interval and reward information, using the selected deep reinforcement learning algorithm, and driving the autonomous vehicle based on the learned policy to determine an action of the autonomous vehicle.

In an embodiment of the present disclosure, selecting one of the plurality of deep reinforcement learning algorithms may include selecting one of PPO, DDPG, TD3 and a deep reinforcement learning algorithm and a deep neural network architecture to train the autonomous vehicle, setting parameters for each of a simulator according to the selected deep reinforcement learning algorithm and the algorithm, and initializing parameters for a deep neural network of the corresponding deep reinforcement learning algorithm.

In an embodiment of the present disclosure, learning the policy which enables the autonomous vehicle to drive at the closest velocity to the constant velocity may include acquiring the state information including the velocity of the autonomous vehicle and the relative velocity and the relative position between the autonomous vehicle and the observable vehicle by the autonomous vehicle at the preset time interval, using the selected deep reinforcement learning algorithm, determining the action of the autonomous vehicle according to the state information, acquiring the reward information according to the action of the autonomous vehicle, acquiring changed road state information according to the action of the autonomous vehicle, and updating the deep neural network based on the reward information.

In an embodiment of the present disclosure, learning the policy which enables the autonomous vehicle to drive at the closest velocity to the constant velocity may further include determining if a change of the deep neural network is equal to or larger than a reference value, and terminating the learning of the policy when the change of the deep neural network is equal to or larger than the reference value, and determining the action of the autonomous vehicle to continue the learning of the policy when the change of the deep neural network is less than the reference value.

In an embodiment of the present disclosure, the action of the autonomous vehicle may be acceleration, and a finite action space may be a set of real numbers from minimum acceleration which is a negative real number to maximum acceleration which is a positive real number.

In an embodiment of the present disclosure, the reward function may include a reward term having a larger value as it is closer to a target velocity and a penalty term using a difference between a preset threshold and an absolute value of acceleration of the autonomous vehicle.

In an embodiment of the present disclosure, learning the policy which enables the autonomous vehicle to drive at the closest velocity to the constant velocity may include acquiring the state information of the autonomous vehicle at each time, selecting and executing the action in the acquired state information, acquiring the reward information according to the executed action and next state information, and updating the deep neural network including a network and a target network based on an objective function for each algorithm according to the acquired state information, action information, reward information and next state information.

In an embodiment of the present disclosure, driving the autonomous vehicle may include acquiring the state information of the autonomous vehicle, selecting the action of the autonomous vehicle according to the acquired state information, and terminating the driving when there is a driving termination condition.

A computer-readable storage medium according to an embodiment for achieving another object of the present disclosure has recorded thereon a computer program for performing the method for combating a stop-and-go wave problem using deep reinforcement learning based autonomous vehicles.

A device for combating a stop-and-go wave problem using deep reinforcement learning based autonomous vehicles according to an embodiment for achieving still another object of the present disclosure includes an algorithm selection unit to select one of a plurality of deep reinforcement learning algorithms for training an autonomous vehicle in a roundabout environment in which autonomous vehicles and non-autonomous vehicles are driving, a reward function determination unit to determine a reward function for acquiring reward information according to an action executed in a specific state to train the autonomous vehicle, a deep neural network architecture determination unit to determine a deep neural network architecture according to the selected deep reinforcement learning algorithm, a policy learning unit to learn a policy which enables the autonomous vehicle to drive at a closest velocity to a constant velocity based on state information including a velocity of the autonomous vehicle and a relative velocity and a relative position between the autonomous vehicle and an observable vehicle by the autonomous vehicle at a preset time interval and reward information, using the selected deep reinforcement learning algorithm, and a policy usage unit to drive the autonomous vehicle based on the learned policy to determine the action of the autonomous vehicle.

In an embodiment of the present disclosure, the algorithm selection unit may select one of PPO, DDPG, TD3 and a deep reinforcement learning algorithm and a deep neural network architecture to train the autonomous vehicle, set parameters for each of a simulator according to the selected deep reinforcement learning algorithm and the algorithm, and initialize parameters for a deep neural network of the corresponding deep reinforcement learning algorithm.

In an embodiment of the present disclosure, the policy learning unit may include a first action determination unit to acquire the state information including the velocity of the autonomous vehicle and the relative velocity and the relative position between the autonomous vehicle and the observable vehicle by the autonomous vehicle at the preset time interval, using the selected deep reinforcement learning algorithm, and determine the action of the autonomous vehicle according to the state information, a reward information acquisition unit to acquire the reward information according to the action of the autonomous vehicle, a first state information acquisition unit to acquire changed state information according to the action of the autonomous vehicle, and a deep neural network update unit to update the deep neural network based on the reward information.

In an embodiment of the present disclosure, the policy learning unit may determine if a change of the deep neural network is equal to or larger than a reference value, terminate the learning of the policy when the change of the deep neural network is equal to or larger than the reference value, and determine the action of the autonomous vehicle to continue the learning of the policy when the change of the deep neural network is less than the reference value.

In an embodiment of the present disclosure, the action of the autonomous vehicle may be acceleration, and a finite action space may be a set of real numbers from minimum acceleration which is a negative real number to maximum acceleration which is a positive real number.

In an embodiment of the present disclosure, the reward function may include a reward term having a larger value as it is closer to a target velocity and a penalty term using a difference between a preset threshold and an absolute value of acceleration of the autonomous vehicle.

In an embodiment of the present disclosure, the policy learning unit may determine a stochastic or deterministic policy indicating a distribution of actions that can be taken in a specific state to maximize future cumulative rewards.

In an embodiment of the present disclosure, the policy usage unit may include a second state information acquisition unit to acquire the state information of the autonomous vehicle, and a second action determination unit to determine the action of the autonomous vehicle according to the acquired state information, and terminate the driving when there is a driving termination condition.

According to the method for combating a stop-and-go wave problem using deep reinforcement learning based autonomous vehicles, a decision making model for controlling traffic flow in a congested environment is proposed. Additionally, an algorithm oriented towards the most efficient driving may be selected and applied by comparative analysis of driving pattern and performance between autonomous vehicles trained through each deep reinforcement learning algorithm.

In particular, it is possible to identify an algorithm for learning the most efficient driving pattern in a roundabout by comparing the performance of PPO, DDPG and TD3 among deep reinforcement learning algorithms.

BRIEF DESCRIPTION OF THE DRAWINGS

FIG. 6 shows an example of deep reinforcement learning based acceleration control pseudocode for autonomous vehicles according to the present disclosure.

DETAILED DESCRIPTION

Figure 1:
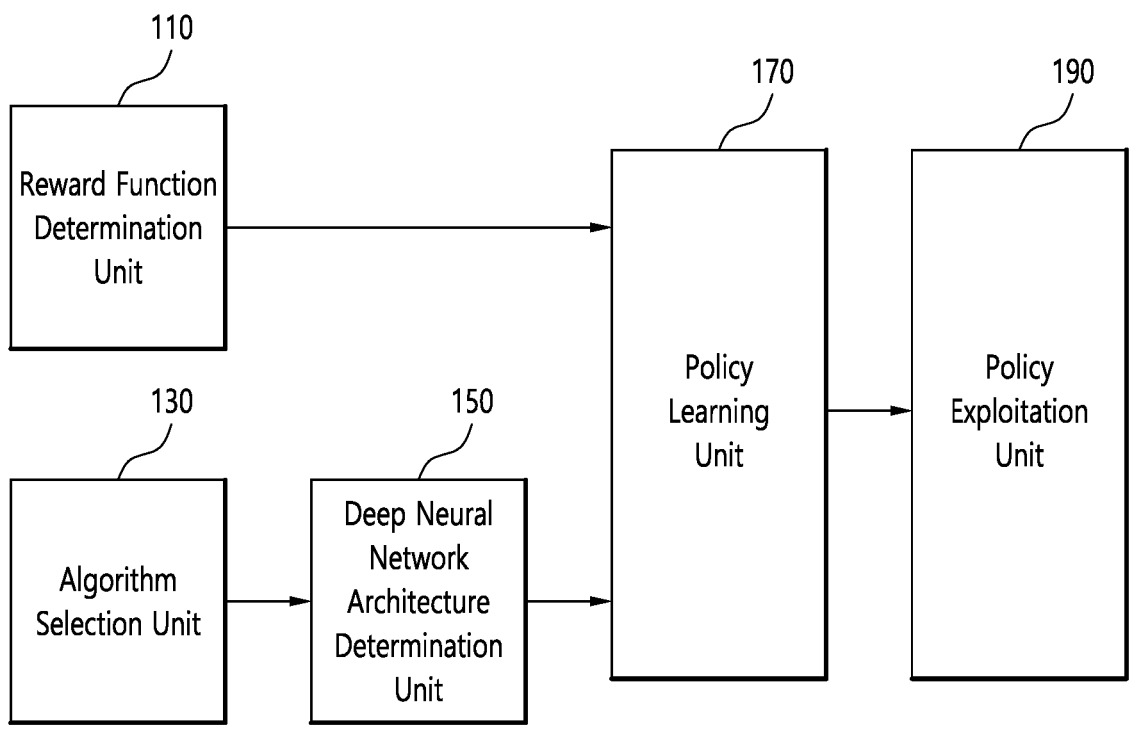
FIG. 1 is a block diagram of a device for combating a stop-and-go wave problem using deep reinforcement learning based autonomous vehicles according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, preferred embodiments of the present disclosure will be described in more detail with reference to the accompanying drawings.

FIG. 1 is a block diagram of a device for combating a stop-and-go wave problem using deep reinforcement learning based autonomous vehicles according to an embodiment of the present disclosure.

The device 10 for combating a stop-and-go wave problem using deep reinforcement learning based autonomous vehicles according to the present disclosure (hereinafter, the device) smooths traffic flows using autonomous vehicles trained to minimize a phenomenon (hereinafter, stop-and-go waves) in which all vehicles repeatedly stop and restart in an undulating pattern similar to waves by deceleration and acceleration in a roundabout environment.

Referring to FIG. 1, the device 10 according to the present disclosure includes an algorithm selection unit 130, a reward function determination unit 110, a deep neural network architecture determination unit 150, a policy learning unit 170 and a policy usage unit 190.

The device 10 of the present disclosure may install and run software (application) for combating a stop-and-go wave problem using deep reinforcement learning based autonomous vehicles, and the algorithm selection unit 130, the reward function determination unit 110, the deep neural network architecture determination unit 150, the policy learning unit 170 and the policy usage unit 190 may be controlled by the software for combating a stop-and-go wave problem using deep reinforcement learning based autonomous vehicles, running on the device 10.

The device 10 may be a separate terminal or module(s) of the terminal. Additionally, the algorithm selection unit 130, the reward function determination unit 110, the deep neural network architecture determination unit 150, the policy learning unit 170 and the policy usage unit 190 may be formed as an integrated module or at least one module. However, to the contrary, each component may be formed as a separate module.

The device 10 may be mobile or fixed. The device 10 may be in the form of a server or an engine, and may be interchangeably called as device, apparatus, terminal, user equipment (UE), mobile station (MS), wireless device and handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The algorithm selection unit 130 selects one of a plurality of deep reinforcement learning algorithms for training an autonomous vehicle in a roundabout environment in which autonomous vehicles and non-autonomous vehicles are driving.

The algorithm selection unit 130 selects one deep reinforcement learning algorithm from PPO, DDPG, TD3 and a deep reinforcement learning algorithm and a deep neural network architecture to train an autonomous vehicle, sets the parameters for each of a simulator according to the selected deep reinforcement learning algorithm and the algorithm, and initializes the parameters for the deep neural network of the corresponding deep reinforcement learning algorithm.

In an embodiment of the present disclosure, one of PPO, DDPG, TD3 and other algorithms among deep reinforcement learning algorithms is used to train the autonomous vehicle, and an algorithm oriented towards the most efficient driving is identified by comparative analysis of driving pattern and performance of autonomous vehicles trained through each algorithm. However, the selected deep reinforcement learning algorithm in the present disclosure is provided by way of example, and other algorithms may be additionally used.

The reward function determination unit 110 determines a reward function for acquiring reward information according to an action taken in a specific state to train the autonomous vehicle.

The deep neural network architecture determination unit 150 determines a deep neural network architecture according to the deep reinforcement learning algorithm selected by the algorithm selection unit 130.

The policy learning unit 170 learns a policy that enables the autonomous vehicle to drive at the closest velocity to constant velocity based on state information including the velocity of the autonomous vehicle and a relative velocity and a relative position between the autonomous vehicle and an observable vehicle by the autonomous vehicle at a preset time interval and reward information, using the selected deep reinforcement learning algorithm.

The policy learning unit 170 may determine if a change of the deep neural network is equal to or larger than a reference value, and when the change of the deep neural network is equal to or larger than the reference value, the policy learning unit 170 may terminate the learning of the policy, and when the change of the deep neural network is less than the reference value, may determine an action of the autonomous vehicle to continue the learning of the policy.

Figure 2:
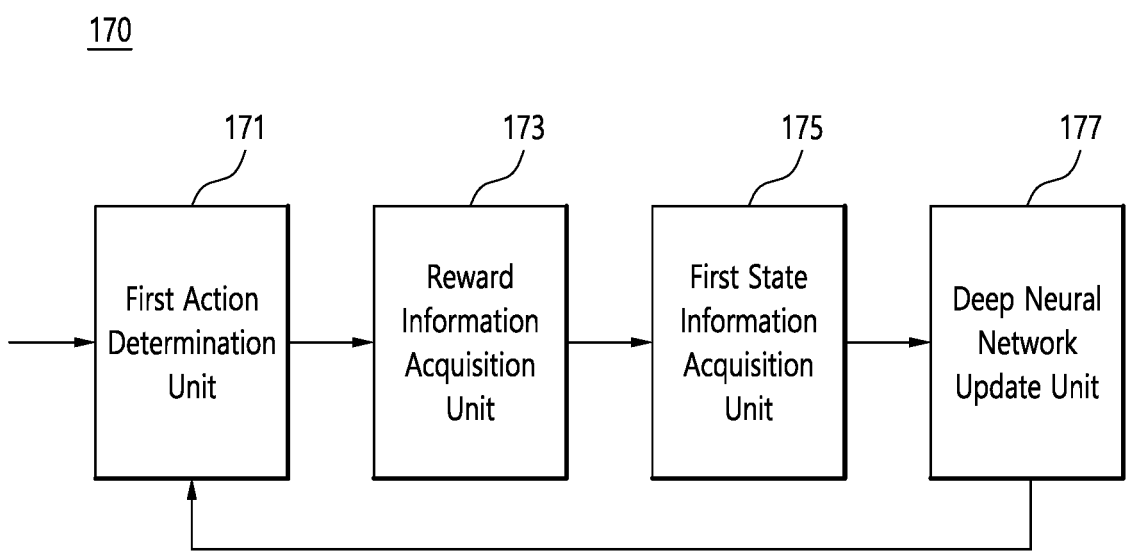
FIG. 2 is a diagram of a policy learning unit of FIG. 1.

Referring to FIG. 2, the policy learning unit 170 may include a first action determination unit 171, a reward information acquisition unit 173, a first state information acquisition unit 175 and a deep neural network update unit 177.

The first action determination unit 171 acquires the state information including the velocity of the autonomous vehicle and the relative velocity and the relative position between the autonomous vehicle and the observable vehicle by the autonomous vehicle at the preset time interval and the reward information, using the selected deep reinforcement learning algorithm, and determines the action of the autonomous vehicle according to the state information.

Figure 4:
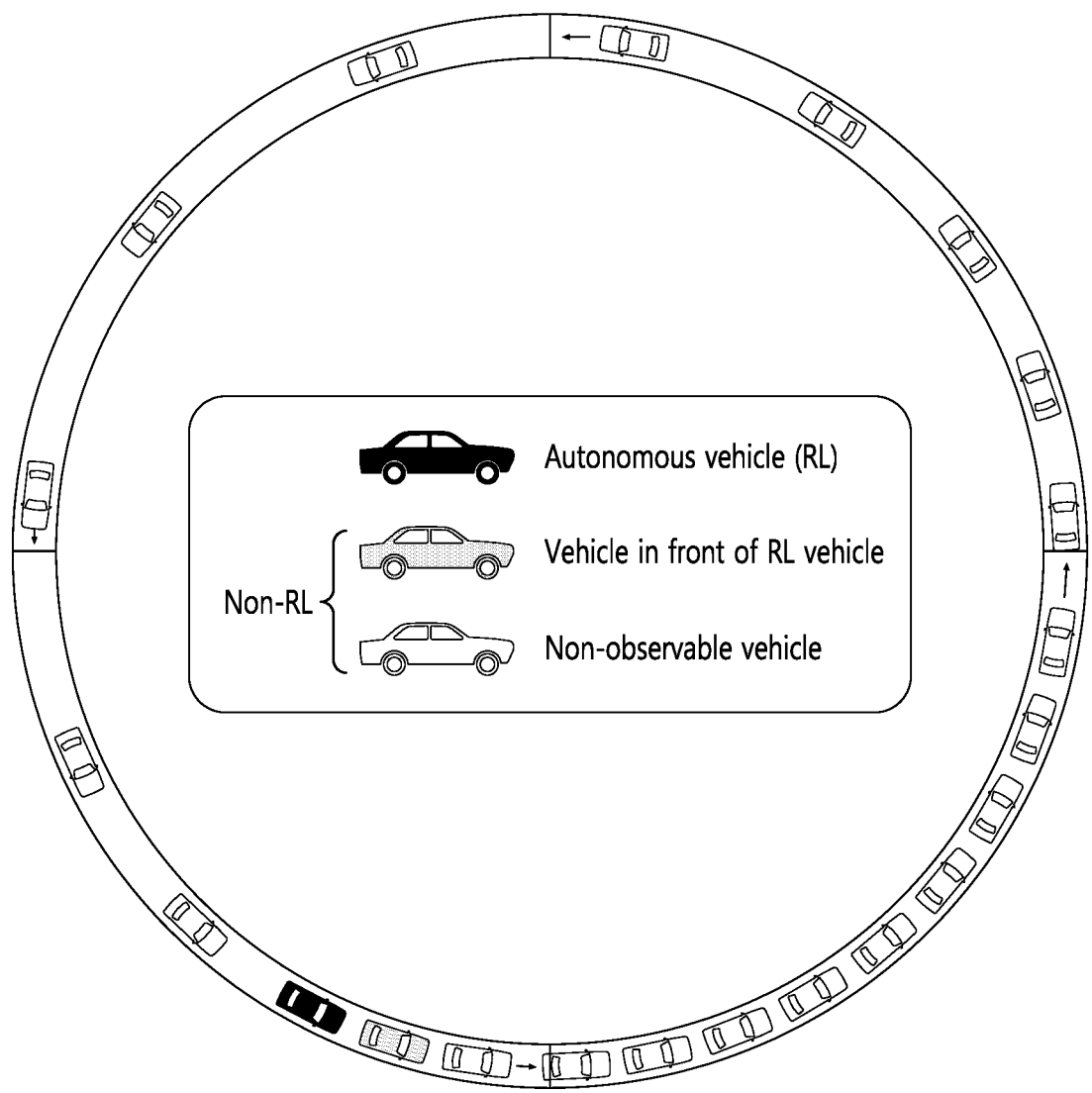
FIG. 4 is a diagram illustrating stop-and-go waves in a roundabout that is an autonomous driving environment of the present disclosure.

Referring to FIG. 4, the present disclosure addresses a roundabout environment in which a congestion phenomenon frequently occurs in a plurality of vehicles. In the roundabout, when a vehicle slows down, vehicles following behind the vehicle slow down one after another, and vehicles speed up on the opposite side of the road, so stop-and-go waves often occur.

A set E of all the vehicles in the roundabout is defined as the following Equation 1.

$$E=\{e_1, \ldots, e_{j-1}, e_j, e_{j+1}, \ldots, e_N\}$$ [Equation 1]

Here, $j^{th}$ vehicle $e_j$ is an autonomous vehicle. All the vehicles except the autonomous vehicle are non-autonomous vehicles and defined as $e_{i, i \neq j}$. The vehicles move on the road in the counterclockwise direction and the vehicle index is defined in the clockwise direction. That is, $j-1^{th}$ vehicle $e_{j-1}$ is a vehicle in front of $e_j$.

In an embodiment of the present disclosure, the number of autonomous vehicles is limited to one, and the total number of vehicles is |E|=N. Accordingly, the number of non-autonomous vehicles is N−1. The length of the roundabout is defined as l. The location of the vehicle is indicated as the actual movement distance from the reference point in the road. The location of $i^{th}$ vehicle $e_i$ at time t is defined as $d_{t,i}$. A set of spaces in which all the vehicles can be located in the road is defined as $D=\{d_{t,i} \in \mathbb{R} | 0 \leq d_{t,i} \leq 1\}$.

In the present disclosure, the autonomous vehicle $e_j$ controls acceleration through a probabilistic model such as a Markov Decision Process (MDP). The MDP probabilistic model may be described as a tuple of <S, A, R, γ>.

S denotes a finite state space in which an agent may be located, and A denotes a finite action space including all actions that the agent can take. R is a reward that the agent receives from environment. Finally, γ is a discount factor and is a variable that determines the importance between immediate reward and delayed reward in the future, and satisfies 0≤γ≤1.

The state information $s_{t,j} \in S$ of the autonomous vehicle $e_j$ at time t is defined as the following Equation 2.

$$s_{t,j} = [v_{t,j}, v_{t,j} - v_{t,j-1}, f(d_{t,j-1} - d_{t,j})]^T$$ [Equation 2]

Here, $v_{t,j}$ denotes the velocity of the autonomous vehicle $e_j$ at time t, and $v_{t,j} - v_{t,j-1}$ denotes the relative velocity between the autonomous vehicle $e_j$ and the vehicle $e_{j-1}$ in front at time t. $f(d_{t,j-1} - d_{t,j})$ denotes the relative position between the autonomous vehicle $e_j$ and the vehicle $e_{j-1}$ in front at time t, and the function f(x) is defined as the following Equation 3 by reflecting the characteristics of the roundabout of the length l.

$$f(x) = \begin{cases} x & x \geq 0 \\ l + x & x < 0 \end{cases}$$ [Equation 3]

For the realistic problem setup, the present disclosure includes only one vehicle $e_{j-1}$ in front in the state information $s_{t,j}$ of the autonomous vehicle $e_j$, not all the vehicles in the road. Accordingly, the dimension of the state information is defined as $s_{t,j} \in \mathbb{R}^{3 \times 1}$.

Figure 5:
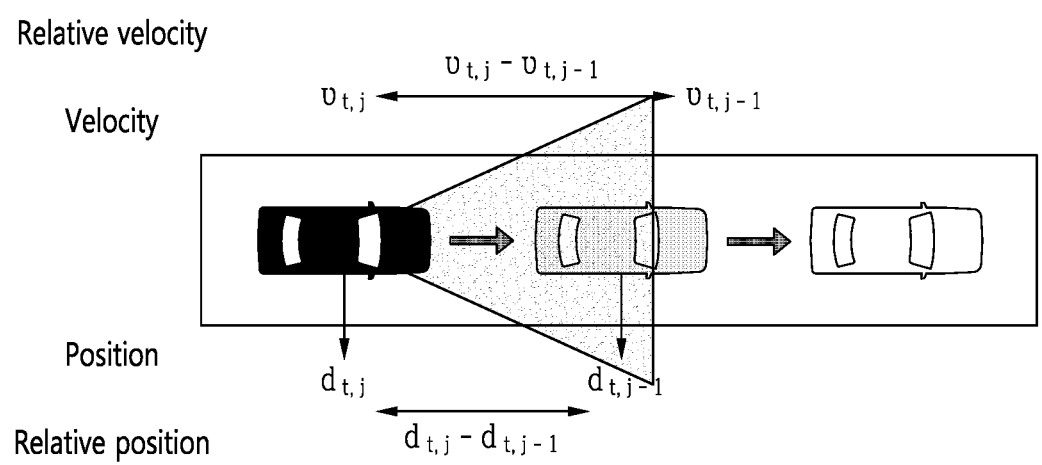
FIG. 5 is a diagram illustrating observable state information by an autonomous vehicle of the present disclosure.

Referring to FIG. 5, observable information by the autonomous vehicle $e_j$ is shown. In this instance, the black vehicle is an autonomous vehicle, and the gray vehicle is an observable non-autonomous vehicle $e_{j-1}$ in front of the autonomous vehicle. The white vehicle indicates a non-observable non-autonomous vehicle.

The action that the autonomous vehicle $e_j$ can take is defined as acceleration $\alpha_{t,j} \in A$. The finite action space A is defined as a set of real numbers $A = \{\alpha_{t,j} \in \mathbb{R} | \alpha_{min} \leq \alpha_{t,j} \leq \alpha_{max}\}$ from the minimum acceleration $\alpha_{min}$ to the maximum acceleration $\alpha_{max}$ physically limited in the vehicle. Here, $\alpha_{min}$ is a negative real number, and $\alpha_{max}$ is a positive real number. $\alpha_{t,j} < 0$ indicates that the brake works, and $\alpha_{t,j} > 0$ indicates that the accelerator works.

The reward information acquisition unit 173 acquires the reward information according to the action of the autonomous vehicle, and the first state information acquisition unit 175 acquires changed state information according to the action of the autonomous vehicle.

The reward function $r_{t,j}$ set to prevent stop-and-go waves in the congested environment is defined as the following Equation 4.

$$r_{t,j} = 1 - \left| \frac{v_{t,j} - v^*}{v^*} \right| + \eta(\xi - |a_{t,j}|)$$ [Equation 4]

The reward function includes two terms. The first term $$1 - \left| \frac{v_{t,j} - v^*}{v^*} \right|$$

is a reward term and is set to have a larger value as the velocity $v_{t,j}$ of the autonomous vehicle in the road is closer to a target velocity $v^*$. Through this, it is possible to mitigate congestion by driving close to the target velocity.

The second term $\eta(\xi - |\alpha_{t,j}|)$ is a penalty term and uses a difference between a threshold ξ and an absolute value of acceleration $\alpha_{t,j}$ of the autonomous vehicle $e_j$. Where ξ=0, the autonomous vehicle may be penalized for acceleration actions. The penalty term enables a specific vehicle to drive at constant velocity by avoiding rapid acceleration and harsh braking which is the cause of stop-and-go waves. Finally, η is a parameter used to scale the penalty term.

The reward function designed as described above enables the autonomous vehicle to drive at constant velocity after the autonomous vehicle reaches a specific velocity. That is, it is expected to prevent congestion and consequential delays, thereby reducing the repeated stop and acceleration.

The deep neural network update unit 177 updates the deep neural network based on the reward information.

The policy learning unit 170 determines if the change of the deep neural network is equal to or larger than the reference value, and when the change of the deep neural network is equal to or larger than the reference value, the policy learning unit 170 terminates the learning of the policy, and when the change of the deep neural network is less than the reference value, determines the action of the autonomous vehicle to continue the learning of the policy.

The final goal of the autonomous vehicle is to learn the optimal policy π* that maximizes future cumulative rewards. In this instance, the policy π indicates a distribution of actions $\alpha_{t,j}$ that can be taken in the state $s_{t,j}$, and the policy may be stochastic $\alpha_{t,j} \sim \pi(s_{t,j})$ and may be deterministic $\alpha_{t,j} = \mu(s_{t,j})$.

To determine the policy, it is necessary to evaluate a state value or state-action value, and a state-value function $V_{t,j}(s)$ or an action-value function (or Q-function) $Q_{t,j}(s, \alpha)$ is used. The value function is defined as the following Equation 5.

$$V_{t,j}(s) = E\left[\sum_{k=0}^{T-t} \gamma^k r_{t+k,j} \mid s_{t,j} = 1\right]$$

$$Q_{t,j}(s, a) = E\left[\sum_{k=0}^{T-1} \gamma^k r_{t+k,j} \mid \theta_{t,j} = s, a_{t,j} = a\right]$$

[Equation 5]

The policy usage unit 190 drives the autonomous vehicle based on the learned policy to determine the action of the autonomous vehicle. The policy usage unit 190 may determine a stochastic or deterministic policy indicating a distribution of actions that can be taken in a specific state to maximize the future cumulative rewards.

Figure 3:
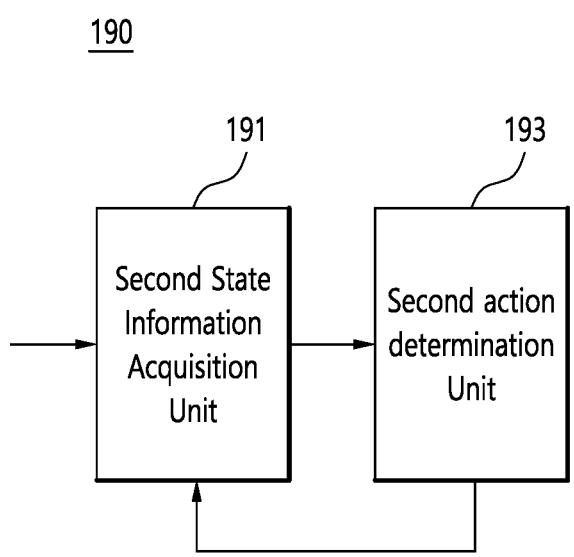
FIG. 3 is a diagram of a policy usage unit of FIG. 1.

Referring to FIG. 3, the policy usage unit 190 may include a second state information acquisition unit 191 to acquire state information of the autonomous vehicle and a second action determination unit 193 to determine the action of the autonomous vehicle according to the acquired state information, and when there is a driving termination condition, terminate the driving.

The proposed learning process to solve the MDP problem can be seen through the algorithm 1 of FIG. 6. To begin with, to train the autonomous vehicle, a deep reinforcement learning algorithm is selected. Additionally, the parameters for each of a simulator and the algorithm are set. Before the start of learning, the parameter θ for a deep neural network of the algorithm is initialized. When setting the parameter, in case that the algorithm is a DQN based algorithm, the parameter θ' for a target network is also initialized.

Each time a total of K episodes is run, the environment and the algorithm are newly initialized every episode, and each episode includes T time steps. Every time step t, the agent acquires state information $s_{t,j}$, and then selects and performs the action $\alpha_{t,j}$ through the policy $\pi_{\theta_{actor}}$ approximated by the actor network. When $\alpha_{t,j}$ is run, the agent acquires next state information $s_{t+1,j}$ together with the reward $r_{t,j}$.

A series of collected information ( $<s_{t,j}, \alpha_{t,j}, r_{t,j}, s_{t+1,j}>$ ) is used to update the network. When an off-policy method such as DDPG or TD3 is used, path information is stored in a replay buffer B and used to update the network. An objective function used to update and evaluate the network differs for each algorithm, and updates the deep neural network including the network and the target network through each objective function.

Hereinafter, the network architecture and the objective function of each deep reinforcement learning algorithm used in an embodiment of the present disclosure will be described.

1. Proximal Policy Optimization (PPO)

A set of networks $\theta = [\theta^\pi, \theta^{VF}]$ of PPO may be classified into an actor network $\theta^\pi$ and a critic network $\theta^{VF}$. The objective function for updating the actor network of PPO is called clipped surrogate objective function and has the following Equation 6.

$$L_t^{CLIP}(\theta^\pi) = \hat{E}_t[\min(r_t(\theta^\pi)\hat{A}_t, \text{clip}(r_t(\theta^\pi), 1-\epsilon, 1+\epsilon)\hat{A}_t)]$$

[Equation 6]

$\theta^\pi$ is a parameter of the actor network for approximating the policy.

$$r_t(\theta) = \frac{\pi_\theta(a_{t,j}|s_{t,j})}{\pi_{\theta_{old}}(a_{t,j}|s_{t,j})} =$$

is a value indicating a probability ratio between the previous policy $\pi_{\theta_{old}}$ and the current policy $\pi_\theta$, and $\hat{A}_t$ is an estimated advantage function as presented in the following Equation 7. Finally, $\epsilon$ is a parameter for setting the reference for clipping.

$$\hat{A}_t = \delta_{t,j} + \gamma \delta_{t+1,j} + \ldots + \gamma^{T-t+1} \delta_{T-1,j}$$

where $\delta_{t,j} = \gamma_{t,j} + \gamma V_{t+1,j}^\pi(s) - V_{t,j}^\pi(s)$ [Equation 7]

The objective function used to update the critic network in PPO is presented in the following Equation 8.

$$L_t(\theta^{VF}) = \max(L_t^{VF_1}, L_t^{VF_2})$$

[Equation 8]

The objective function $L_t^{VF}$ of the critic network may be represented using a larger value of two objective functions $L_t^{VF_1}$ and $L_t^{VF_2}$. $L_t^{VF_1} = (V_{\theta^{VF}}(s_{t,j}) - V_t^{targ})^2$ is represented through the squared error, i.e., the squared difference between the target value function $V_t^{targ}$ and the current value function $V_{\theta^{VF}}(s_{t,j})$ approximated by the parameter $\theta^{VF}$ of the critic network. $L_t^{VF_2} = (V_t^{CLIP} - V_t^{targ})^2$ is represented through the squared error between $V_t^{CLIP}$ (see Equation 9) and the target value function $V_t^{targ}$. In this instance, $V_t^{pred}$ denotes a predicted value function, i.e., an output value of the value function obtained from the network before updates.

$$V_t^{CLIP} = V_t^{pred} + \min(\max(V_{\theta^{VF}}(s_{t,j}) - V_t^{pred}, -\epsilon), \epsilon)$$

[Equation 9]

Figure 7:
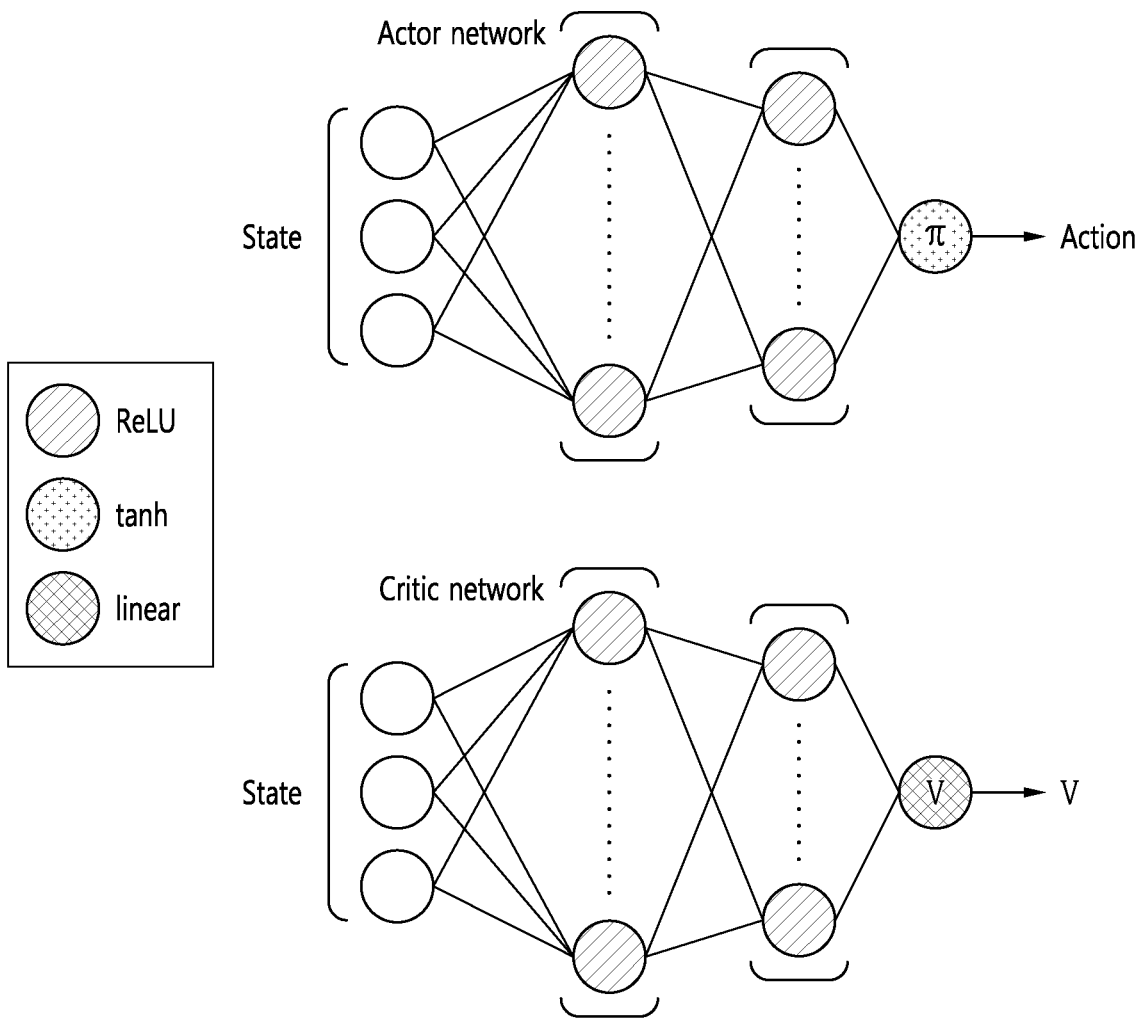
FIG. 7 is a diagram illustrating the deep neural network architecture of PPO among learning algorithms used in the present disclosure.

Approximation of the objective function is computed by the deep neural network of the PPO algorithm. FIG. 7 shows an example of the deep neural network architecture of the PPO algorithm. The actor network uses the state information $s_{t,j}$ observed by the agent as an input value. The input value produces an output, action $\alpha_{t,j}$, in the policy π through the hidden layer. Likewise, the critic network uses the state information $s_{t,j}$, but outputs the value function $V^\pi$ through the hidden layer. The activation function of each class and each class and node of the hidden layer are determined by a user.

2. Deep Deterministic Policy Gradient (DDPG)

A set of networks $\theta = [\theta^\mu, \theta^Q]$ of DDPG may be also classified into an actor network $\theta^\mu$ and a critic network $\theta^Q$. Additionally, DDPG is an off-policy based algorithm and has a set of target networks $\theta' = [\theta^{\mu'}, \theta^{Q'}]$. The objective function $L(\theta^Q)$ of the critic network for the Q-function is presented in the following Equation 10.

$$L(\theta^Q) = \frac{1}{M} \sum_t [(Q(s_{t,j}, o_{t,j} | \theta^Q) - \mu_t)^2]$$

[Equation 10]

Here, target $y_t = r(s_{t,j}, \alpha_{t,j}) + \gamma Q^\mu(s_{t+1,j}, \mu(s_{t+1,j}))$ is the sum of Q-function values under the reward and the target policy μ'. In this instance, the deterministic argmax method is used when selecting the action $\alpha_{t+1,j}$ like $\mu(s_{t+1,j}) = \text{argmax}_{\alpha_{t+1,j}} Q^\mu(s_{t+1,j}, \mu(s_{t+1,j}))$. M denotes a batch size. The critic network is trained toward minimizing the objective function of Equation 10.

The objective function of the actor network for policy optimization of DDPG is presented in the following Equation 11.

$$L(\theta^Q) \approx \frac{1}{M}\sum_t Q(s, \mu(s|\theta^\mu)|\theta^Q) \quad \text{[Equation 11]}$$

DDPG updates the target network each time as shown in the following Equation 12.

$$\theta^{Q'} \leftarrow \tau\theta^Q + (1-\tau)\theta^{Q'}$$

$$\theta^{\pi'} \leftarrow \tau\theta^\mu + (1-\tau)\theta^{\mu'} \quad \text{[Equation 12]}$$

In Equation 12, $\theta^Q$ is a parameter for approximating the Q-function of the critic network, and $\theta^{Q'}$ is a parameter for approximating the target Q-function. $\theta^\mu$ is a policy approximation parameter of the actor network, and $\theta^{\mu'}$ is a parameter for approximating the target policy.

Figure 8:
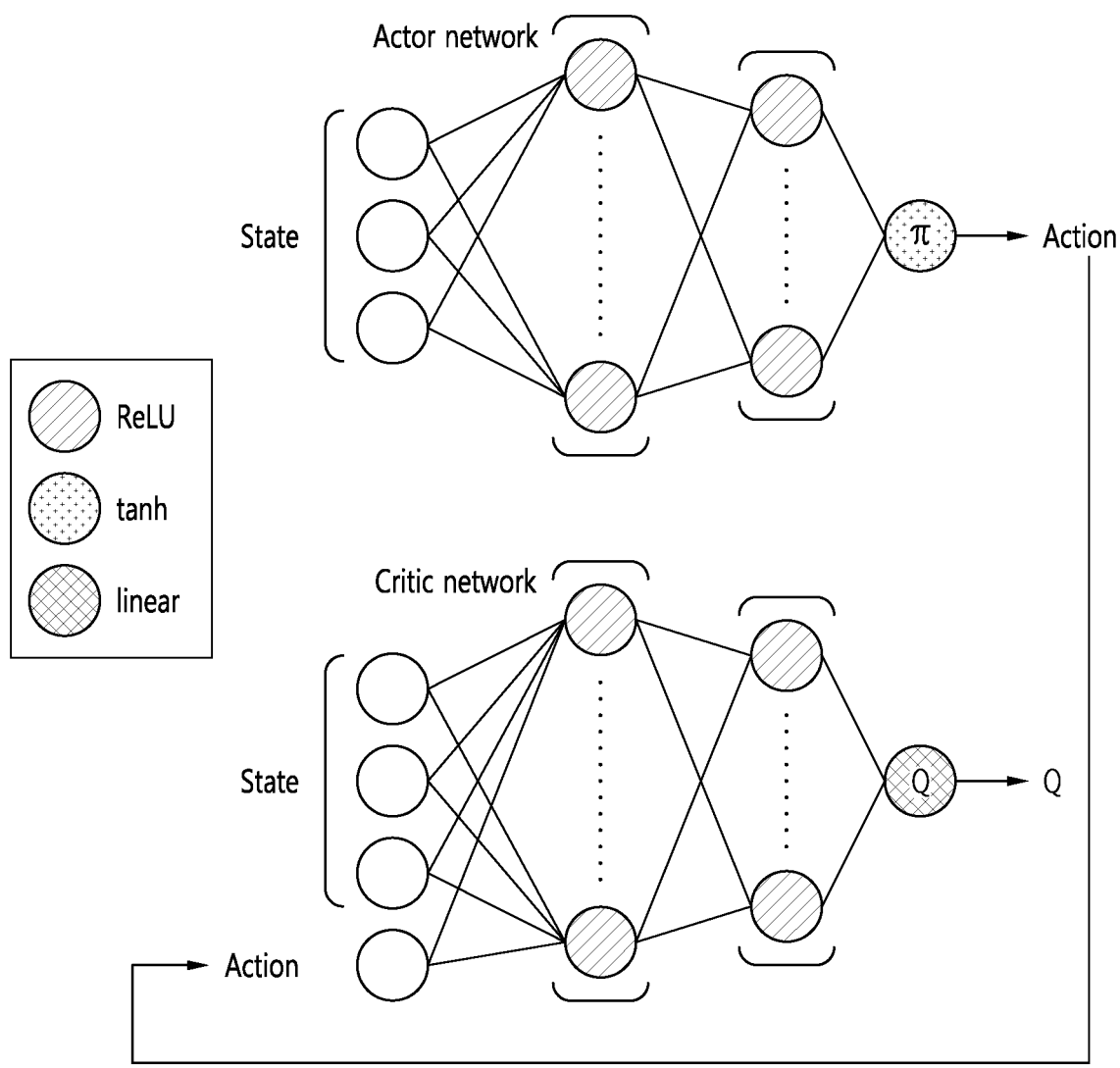
FIG. 8 is a diagram illustrating the deep neural network architecture of DDPG among learning algorithms used in the present disclosure.

$\tau$ used in the update equation of each network is a parameter for adjusting a change in the target network. As $\tau \in [0,1]$ is closer to 1, the parameter of the target network is more likely to change, and as $\tau \in [0,1]$ is closer to 0, the parameter of the target network is less likely to change. This method is known as soft update, whereby DDPG constrains the target network to change slowly. Approximation of the objective function is made through the deep neural network, and an example of the deep neural network architecture of DDPG is shown in FIG. 8.

3. Twin Delayed DDPG (TD3)

A set of networks $\theta=[\theta^\mu, \theta^{Q_1}, \theta^{Q_2}]$ of TD3 and a set of target networks $\theta'=[\theta^{\mu'}, \theta^{Q'_1}, \theta^{Q'_2}]$ include one more critic network added to the network of DDPG. Additionally, the objective function used in TD3 has the same configuration as DDPG, and only the method of finding the objective function $y_t$ of Equation 10 used in the critic network is changed to the following Equation 13.

$$y_t = r(s_{t,j}, \alpha_{t,j}) + \gamma \min_{i=1,2} Q_{\theta'_i}(s_{t+1,j}, \mu(s_{t+1,j}) + \omega)$$

$$\omega \sim \text{clip}(N(0,\sigma), -\epsilon, \epsilon) \quad \text{[Equation 13]}$$

This is an improved method to solve the overestimation bias of DDPG. A smaller value of the Q-functions approximated by the two networks is used through $\min_{i=1,2} Q_{\theta'_i}$. Additionally, clipped random noise $\omega$ is added in the action selection process by applying a smoothing technique to the target policy.

TD3 and DDPG have a difference in network update method. DDPG trains all networks in a sequential order at each preset time step, whereas TD3 uses a delayed update method. This method delays the update cycle of the target network and the actor network, rather than the critic network. Through this, the Q-function is stabilized, thereby preventing overestimation and error accumulation that occurs in the other networks. As a result, it is possible to predict values with low variance and guarantee the quality of the policy.

The deep neural network architecture of TD3 is also generally similar to DDPG. However, since TD3 uses twin Q-learning, there are network parameters $\theta_1$ and $\theta_2$ for Q-functions $Q_1$ and $Q_2$ respectively as can be seen through FIG. 9.

The policy usage unit 190 applies the deep reinforcement learning algorithm which enables the autonomous vehicle to drive at the closest velocity to constant velocity according to the learned policy as a decision making algorithm for controlling the acceleration of the autonomous vehicle.

In an embodiment, the algorithm which enables the autonomous vehicle to drive at the closest velocity to constant velocity may be selected by analysis of velocity and acceleration through comparison of driving patterns according to each algorithm.

In other embodiment, an algorithm having the lowest power consumption may be selected using power consumption which is an amount of energy per unit time as an evaluation indicator through the compared driving patterns. However, in the case of constant velocity driving, it is general that as a change in acceleration is smaller, efficiency is higher in terms of energy of the vehicle.

Hereinafter, the performance is analyzed by simulation of each of the above-described algorithms. The road is a circular structure as shown in FIG. 4. In the simulation, the length of the road is fixed to l=260 m. In contrast, the road length is arbitrarily set to $l \in [220 \text{ m}, 270 \text{ m}]$ each time simulation is initialized to prevent overfitting to a specific road length in the process of training the autonomous vehicle $e_i$.

Training and performance evaluation is performed in the simulation environment. The simulation is composed of two stages: a warm-up period $T_W=750$ ts and an episode $T_E=3000$ ts. That is, in the entire simulation, an episode is composed of $T=T_W+T_E=3750$ ts. The warm-up period is traditionally set to solve the start-up problem that occurs at the start of simulation. Data for the warm-up period is not included in training, and is, for example, 1 ts=0.1 s in this experiment.

The number of vehicles driving on the road is N=22. The number of autonomous vehicles in the road is 1, and the black vehicle of FIG. 4 is an autonomous vehicle $e_i$. The remaining 21 vehicles are all non-autonomous vehicles, and the gray vehicle of FIG. 4 is an observable vehicle $e_{i-1}$ in front of the autonomous vehicle during training. The white vehicle is a non-observable non-autonomous vehicle $e_{j, i \neq j, j-1}$. The size of all the vehicles is equally set to 5 m. The range of the action space of the autonomous vehicle is $A=\{\alpha_{t,j} \in \mathbb{R} | -1 \leq \alpha_{t,j} \leq 1\}$.

Figure 10:
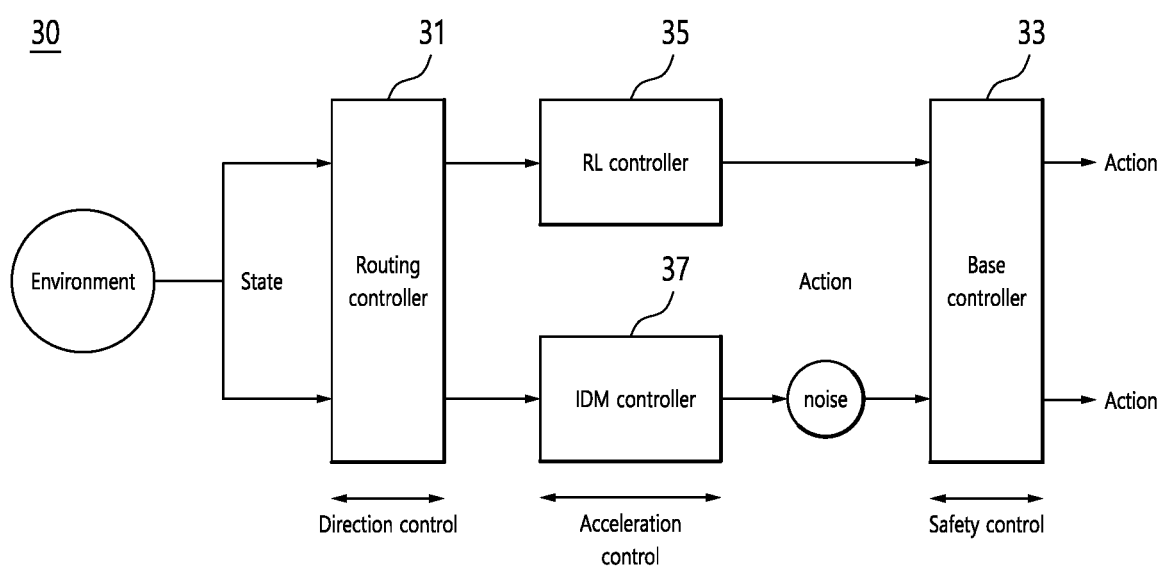
FIG. 10 is a diagram showing action selection of vehicles and controller configuration.

FIG. 10 shows the action selection of the vehicles and the configuration of a controller 30. All the vehicles have a routing controller 31 for the road structure to control the travel direction by calculating the path at each time step. Additionally, all the vehicles include a base controller 33. The base controller 33 plays a role in safety assistance such as an advanced driver assistance system. For example, when the distance from the vehicle in front is closer than the safe distance, an action such as harsh braking is executed.

The autonomous vehicle executes the action $\alpha_{t,j}$ suitable for the specific state based on learned information through a RL controller 35. In contrast, the non-autonomous vehicle is set to determine the action $\alpha_{t,i}(e_i, i \neq j)$ while keeping the safe distance from the vehicle in front using an Intelligent Driving Model (IDM) controller 37.

The IDM controller 37 adjusts the acceleration $\alpha_{t,i}(e_i, i \neq j)$ of the non-autonomous vehicle through the following Equation 14.

$$a_{t,i} = 1 - \left(\frac{v_{t,i}}{v^*}\right)^\delta - \left(\frac{g(v_{t,i}, v_{t,i} - v_{t,i-1})}{f(d_{t,i-1} - d_{t,i})}\right)^2 \quad \text{[Equation 14]}$$

$$e_i, i \neq j$$

Here, v* denotes the target velocity, and δ denotes a velocity exponent. Where $$v_{t,i} < v^*, \ 1 - \left(\frac{v_{t,i}}{v^*}\right)^\delta > 0,$$

positive acceleration is determined. It is designed in such a way that in the case of the target velocity $v^* = v_{t,i}$, acceleration is determined to be 0 for constant velocity driving, and where $v^* < v_{t,i}$, negative acceleration is determined to guide the vehicle to maintain v*.

The third term $$\left(\frac{g(v_{t-i}, v_{t,i} - v_{t,i-1})}{f(d_{t,i-1} - d_{t,i})}\right)^2$$

in Equation 14 plays an assistant role in keeping the safe distance between the non-autonomous vehicle $e_i$ and the vehicle $e_{i-1}$ in front of $e_i$. Here, the function g obeys the following Equation 15, and f obeys Equation 3 and is set to d*=2 m, t*=1 s.

$$g(v_{t,i}, v_{t,i} - v_{t,i-1}) = d^* + \max\left[0, \left(v_{t,i} \times t^* + \frac{v_{t,i}(v_{t,i} - v_{t,i-1})}{2\sqrt{a_{max} \times |a_{min}|}}\right)\right] \quad \text{[Equation 15]}$$

In this instance, t* is the time headway and denotes a difference of time taken for $e_i$ and $e_{i-1}$ to arrive at the same location. It is set to represent the drivers' actual unexpected behaviors by adding noise having a Gaussian distribution of N(0,0.2) to $\alpha_{t,i}$(단, i≠j) determined by the IDM controller 37.

Hereinafter, the deep neural network architecture and learning setup used in the autonomous vehicles of the present disclosure and performance evaluation for each deep reinforcement learning algorithm will be described.

The deep reinforcement learning algorithms PPO, DDPG and TD3 used in the present disclosure have all the actor-critic architecture. The critic network of PPO approximates the value function. The state information is used as the input value of all networks of PPO. The deep neural network architecture of PPO used in the present disclosure is shown in FIG. 7.

Figure 9:
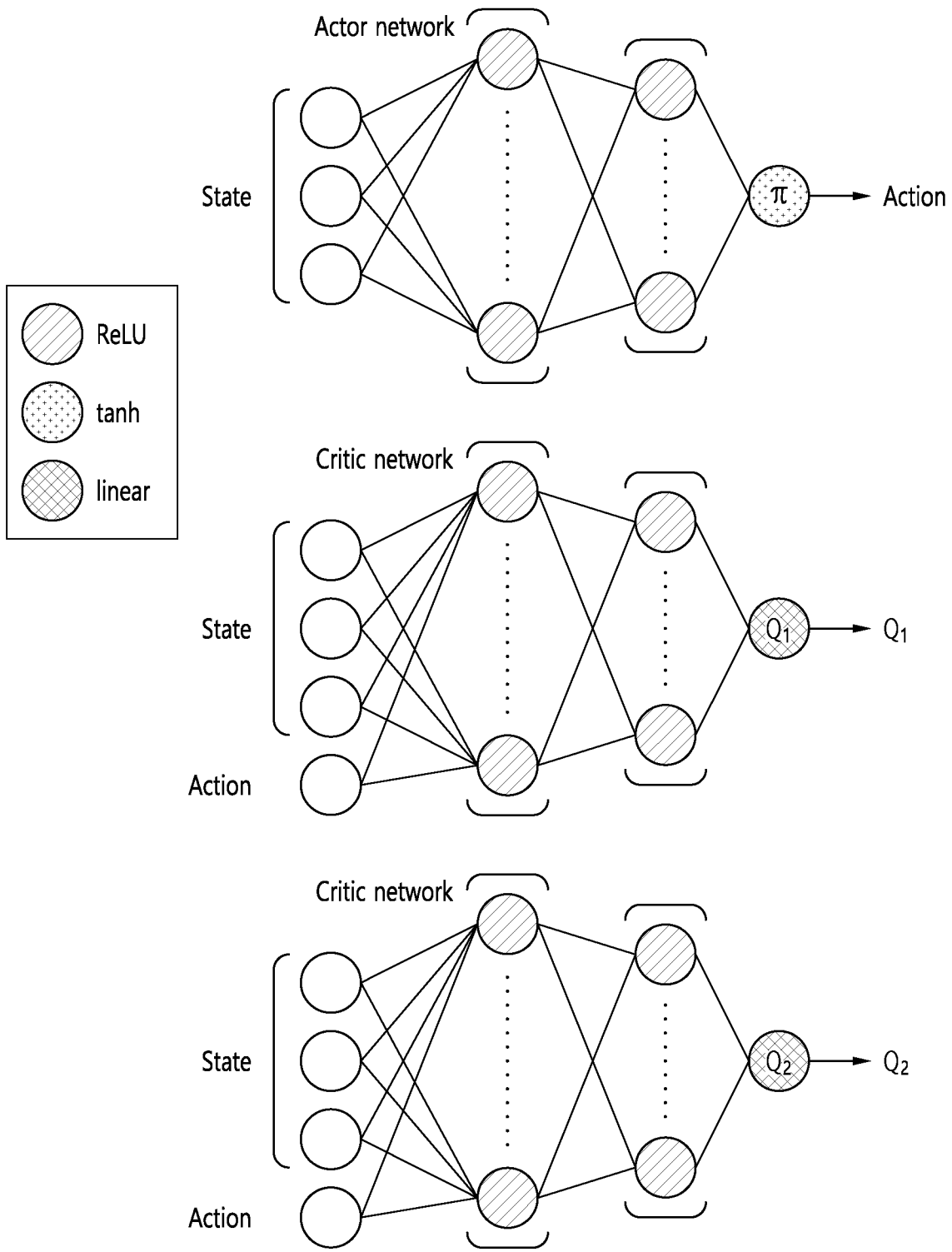
FIG. 9 is a diagram illustrating the deep neural network architecture of TD3 among learning algorithms used in the present disclosure.

In contrast, the critic network of DDPG and TD3 approximates the Q-function. Accordingly, the state information and the action information are used together as the input value of the critic network. The deep neural network architectures of DDPG and TD3 used in the present disclosure are shown in FIGS. 8 and 9, respectively.

The exploration process for finding the better policy at the initial stage of learning is performed by the stochastic sampling method in the case of PPO. DDPG is implemented by adding Ornstein-Uhlenbeck noise, and TD3 is implemented by adding Gaussian noise. The policy delay ϕ used in TD3 alone is a parameter necessary for delayed update, and is set to update the actor network and the target network once when updating the critic network twice.

The present disclosure performs driving performance evaluation and driving pattern analysis of the autonomous vehicles trained using the three algorithms. For quantitative performance evaluation of each algorithm, a change in accumulative mean reward of a single episode is plotted.

To analyze the driving pattern which is the qualitative performance of the autonomous vehicle, a change in velocity and acceleration in a single episode with a change in time step is plotted. Finally, to evaluate the mitigation of stop-and-go waves in the roundabout that the present disclosure intends to solve, a comparison is made with a network composed only of non-autonomous vehicles. To this end, a velocity change of non-autonomous vehicle and a velocity variance of 22 vehicles at each time step is plotted.

For performance evaluation, 10 random seed numbers are generated and one vehicle is trained for each random seed number. The results of 10 trained vehicles for each algorithm are shown.

Figure 11:
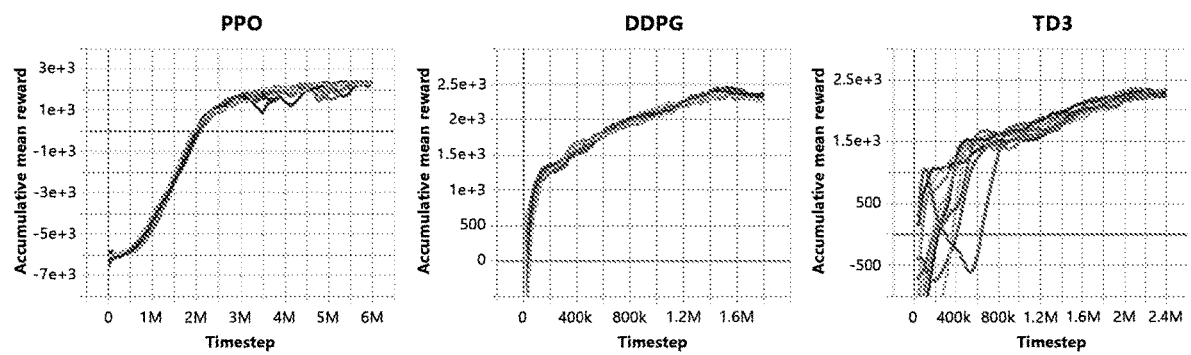
FIG. 11 is a diagram showing the accumulative mean reward of a single episode over time in each deep reinforcement learning algorithm.

The learning process for each deep reinforcement learning algorithm can be seen through FIG. 11. FIG. 11 shows the cumulative reward that can be obtained in a single episode at each time step. The results show that all the three algorithms converge to values between 2200-2350.

Referring to FIG. 11, it can be seen that DDPG and TD3 converge faster than PPO. It is interpreted that the two algorithms ensure effective exploration due to using the deterministic policy and the off-policy method. Due to these features of the policy, in the case of TD3 and DDPG, each agent maintains a constant value at the convergence stage.

TD3 is trained more slowly than DDPG, since TD3 delays the policy update and learns by selectively using a minimum value of two Q-functions. Additionally, DDPG has a learning tendency to overestimation compared to TD3.

PPO uses an on-policy method that does not make a difference between a target policy and an action policy, so more time steps than the two other algorithms are required to converge. Additionally, PPO trains a stochastic policy by selecting an action in a distribution of policies with optimal variance. Due to this difference, a specific agent goes into a convergence orbit, and then moves away from the curve at a certain point.

Figure 12:
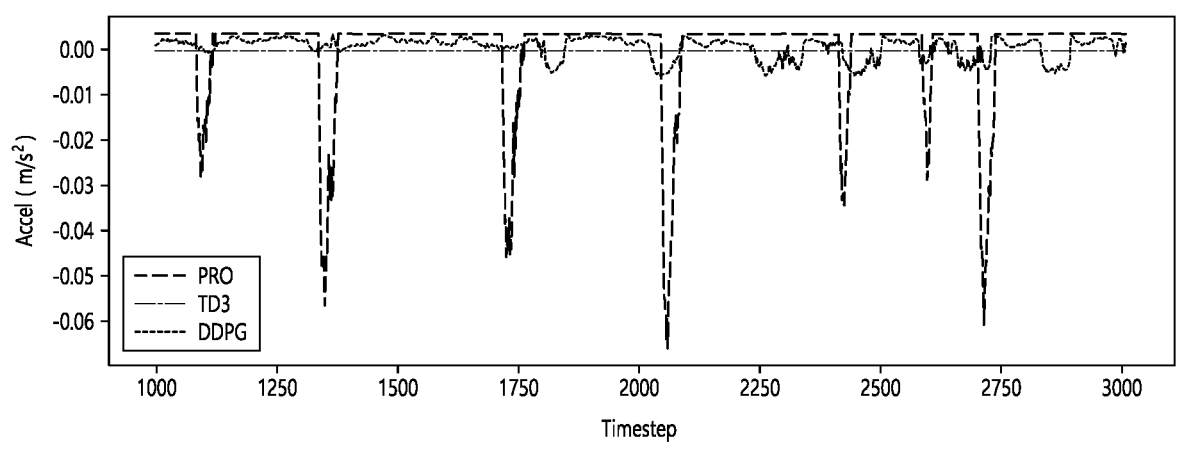
FIG. 12 is a diagram showing an acceleration change of an autonomous vehicle over time in each deep reinforcement learning algorithm.
Figure 13:
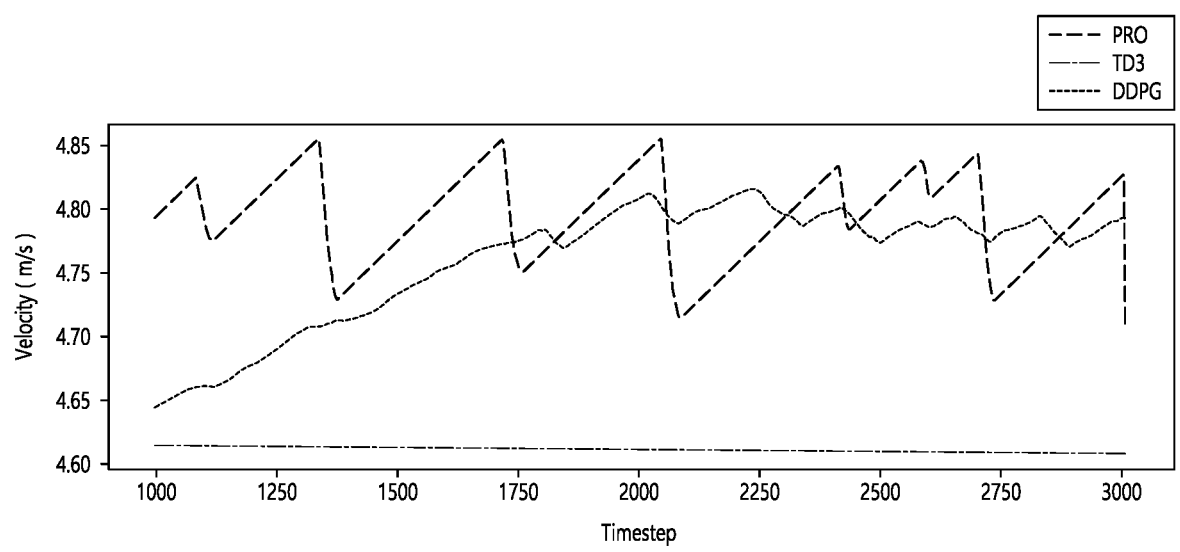
FIG. 13 is a diagram showing a velocity change of an autonomous vehicle over time in each deep reinforcement learning algorithm.

Additionally, the driving performance and pattern of the autonomous vehicle is analyzed for each algorithm. FIG. 12 is a graph showing an acceleration change of the autonomous vehicle over time in a single episode, and FIG. 13 is a graph showing a velocity change of the autonomous vehicle over time.

Describing a change in acceleration with reference to FIG. 12, the vehicle trained with PPO makes a constant acceleration motion while maintaining positive acceleration and then brakes with instantaneous negative acceleration. The vehicle trained with DDPG also brakes with an acceleration motion, but its extent is weaker than PPO. This braking is to ensure the safe distance when the relative distance from the vehicle in front is short.

In contrast, the acceleration of the vehicle trained with TD3 converges to 0 during driving, exhibiting a constant acceleration motion. This difference in driving pattern can be closely seen through FIG. 13. The velocity of the vehicle trained with PPO continuously decreases and increases over time. When compared with PPO, it may be determined that the vehicle trained with DDPG controls the velocity more naturally.

Since the vehicles trained with the two algorithms seek acceleration driving, the vehicles continually change the velocity between about 4.75 m/s~4.85 m/s while driving. In contrast, the velocity change curve of the vehicle trained with TD3 over time shows that the vehicle drives at the velocity of about 4.62 m/s close to constant velocity.

To determine if the stop-and-go wave problem that the present disclosure ultimately aims at solving has been solved, the velocity in a road where there are autonomous vehicles and the velocity in a road where there are only non-autonomous vehicles are compared. For quantitative performance evaluation, a velocity change of one randomly selected non-autonomous vehicle and a velocity variance value of all the vehicles in each road is identified.

The presence or absence of stop-and-go waves may be determined by determining the amplitude of the velocity change graph, and for quantitative measurement, the velocity variance value of all the vehicles is used. When the variance value is small, it indicates that the vehicles in the road move at similar velocities, and stop-and-go waves are solved.

Figure 14:
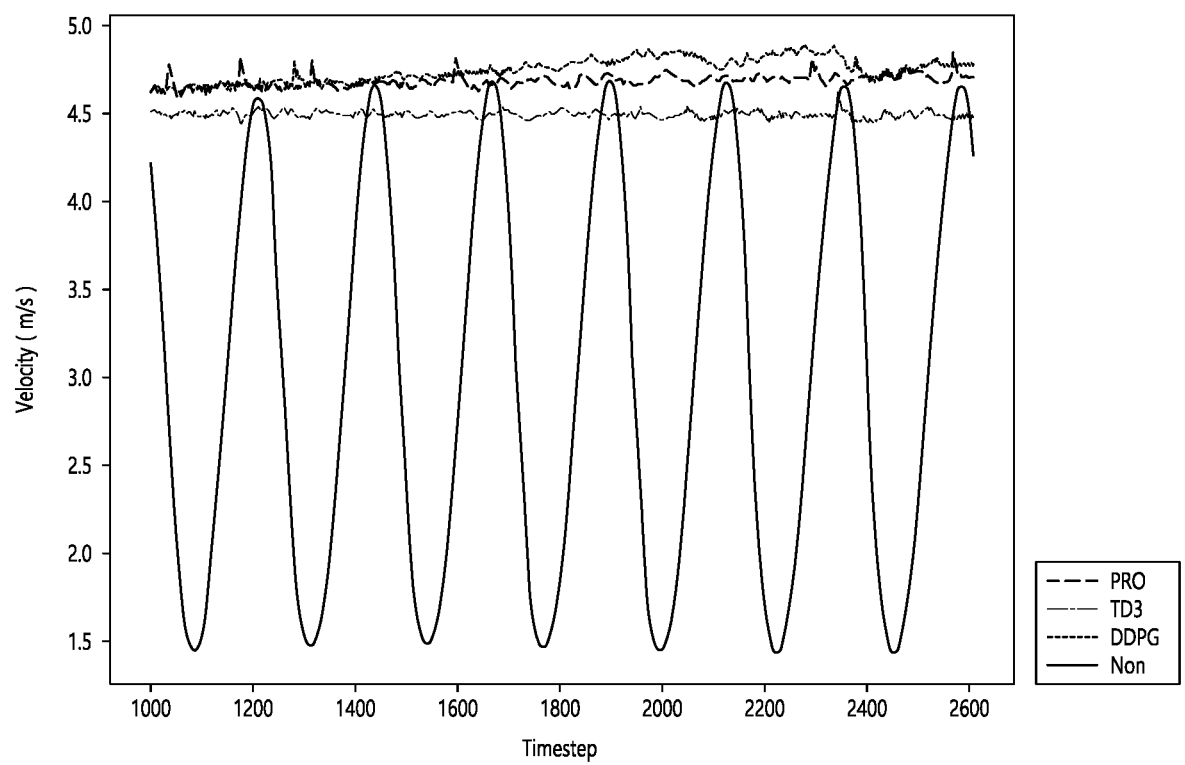
FIG. 14 is a diagram showing a velocity change of a non-autonomous vehicle over time in each deep reinforcement learning algorithm.

FIG. 14 is a graph showing the velocity change of the non-autonomous vehicle over time in each network. The velocity change of the non-autonomous vehicle on the road including PPO, TD3, and DDPG does not exhibit high amplitude. In contrast, in the case of the road where there are only non-autonomous vehicles, very high amplitude is exhibited due to stop-and-go waves.

Figure 15:
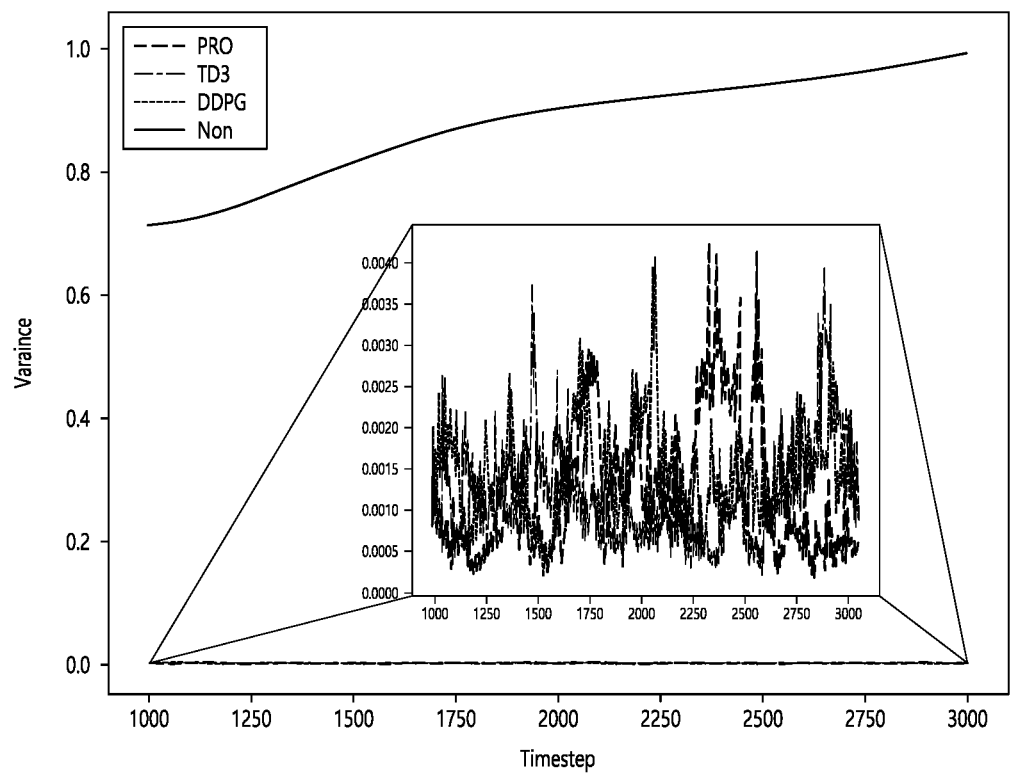
FIG. 15 is a diagram showing the velocity variance of all vehicles over time in each deep reinforcement learning algorithm.

FIG. 15 is a graph showing the velocity variance of all the vehicles over time. A large variance indicates non-constant velocity of the vehicles. That is, it indicates that stop-and-go waves were not solved due to the continuous velocity change. The network composed only of non-autonomous vehicles exhibits a large variance and the network including autonomous vehicles exhibits a variance close to 0.

The detailed tendency of variance for each algorithm can be also seen through FIG. 15. Additionally, the average velocity in each network can be seen through Table 1.

TABLE 1

| Algorithm | Non | PPO | DDPG | TD3 |
| --- | --- | --- | --- | --- |
| Velocity (m/s) | 2.97 | 4.75 | 4.72 | 4.61 |
| Variance | 0.88 | 0.001 | 0.001 | 0.001 |

Referring to Table 1, the network including autonomous vehicles trained with each algorithm exhibits an increase in average velocity by 60% (PPO), 59% (DDPG) and 55% (TD3) compared to the network including no autonomous vehicle.

The present disclosure analyzes the mitigation of stop-and-go waves in the roundabout by training the autonomous vehicles through the deep reinforcement learning algorithm and the driving pattern for each algorithm. The network including autonomous vehicles trained by the proposed MDP model effectively controls stop-and-go waves when compared to the network composed only of non-autonomous vehicles.

The average velocity on the road exhibits a high increase of 55% or more when the autonomous vehicles are driving. A difference of performance between the vehicles trained through each algorithm is also seen. Seeing the converging performance indicators, training with TD3 is found to be the most stable across the overall indicator.

As a result of comparing the driving patterns through qualitative results, it is found that the vehicles trained with PPO and DDPG seek acceleration driving and use braking. In contrast, it is found that the vehicles trained with TD3 seek constant velocity driving. In this case, it is found that TD3 has higher energy efficiency due to less deceleration and acceleration of the autonomous vehicles than two other algorithms.

Figure 16:
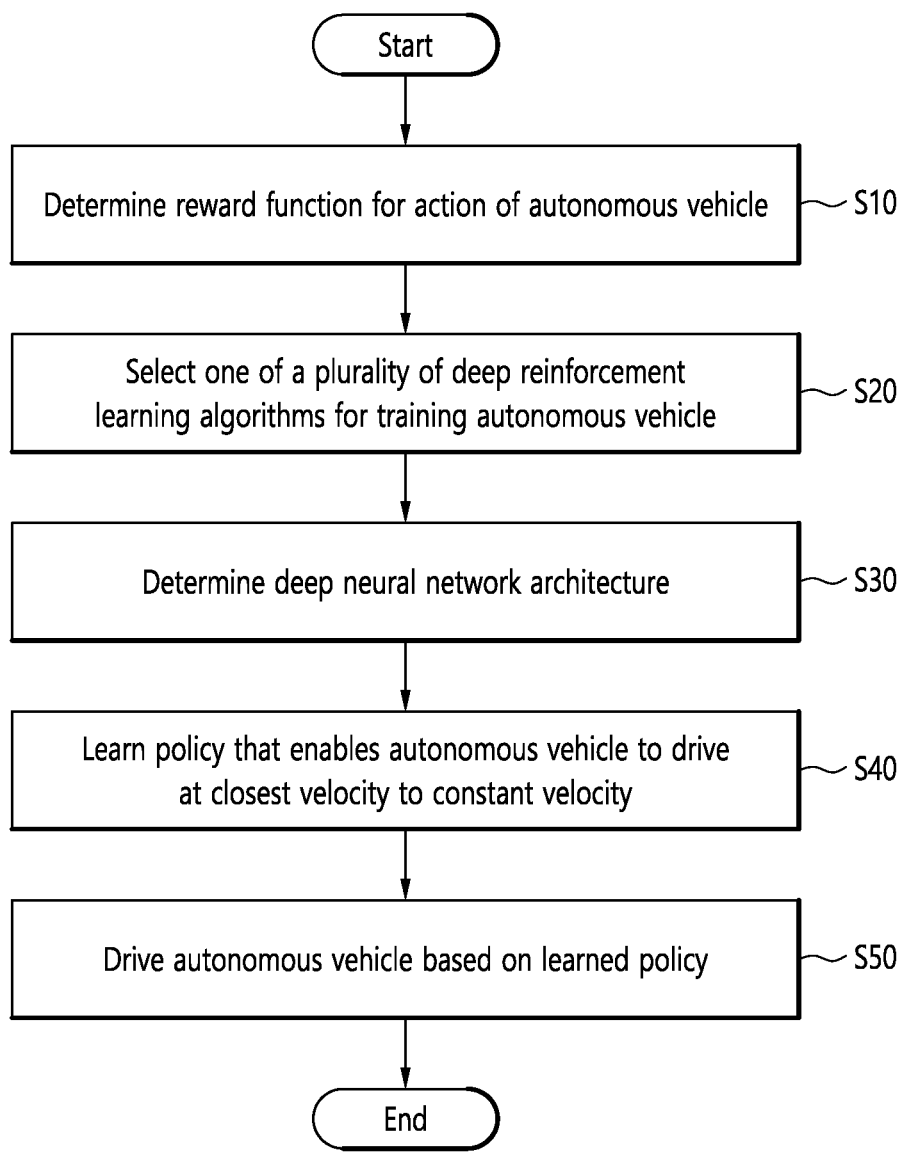
FIG. 16 is a flowchart of a method for combating a stop-and-go wave problem using deep reinforcement learning based autonomous vehicles according to an embodiment of the present disclosure.

FIG. 16 is a flowchart of a method for combating a stop-and-go wave problem using deep reinforcement learning based autonomous vehicles according to an embodiment of the present disclosure.

The method for combating a stop-and-go wave problem using deep reinforcement learning based autonomous vehicles according to this embodiment may be performed in substantially the same configuration as the device 10 of FIG. 1. Accordingly, the same element as the device 10 of FIG. 1 is given the same reference sign, and a repetitive description is omitted herein.

Additionally, the method for combating a stop-and-go wave problem using deep reinforcement learning based autonomous vehicles according to this embodiment may be performed by the software (application) for combating a stop-and-go wave problem using deep reinforcement learning based autonomous vehicles.

The present disclosure smooths traffic flow using autonomous vehicles trained to minimize a phenomenon (hereinafter, stop-and-go waves) in which all vehicles repeatedly stop and restart in an undulating pattern similar to waves by deceleration and acceleration in a roundabout environment.

Referring to FIG. 16, the method for combating a stop-and-go wave problem using deep reinforcement learning based autonomous vehicles according to this embodiment includes selecting one of a plurality of deep reinforcement learning algorithms for training an autonomous vehicle and a reward function in a roundabout environment in which autonomous vehicles and non-autonomous vehicles are driving (Step S10 and Step S20).

In an embodiment of the present disclosure, PPO, DDPG and TD3 are used among deep reinforcement learning algorithms to train the autonomous vehicle, and an algorithm oriented towards the most efficient driving is identified by comparative analysis of driving pattern and performance of autonomous vehicles trained through each algorithm. However, the selected deep reinforcement learning algorithm is provided by way of example, and the present disclosure may additionally use other algorithms.

Along with the algorithm selection, the step S20 includes setting the parameters for a simulator according to each deep reinforcement learning algorithm and the algorithm. The parameter and simulator environment for the deep neural network of the corresponding deep reinforcement learning algorithm are initialized.

The reward function for an action of the autonomous vehicle may include a reward term having a larger value as it is closer to a target velocity and a penalty term using a difference between a preset threshold and an absolute value of acceleration of the autonomous vehicle.

The reward function designed as described above enables the autonomous vehicle to drive at constant velocity after the autonomous vehicle reaches a specific velocity. That is, it is expected to prevent congestion and consequential delays, thereby reducing the repeated stop and acceleration.

Subsequently, deep neural network architecture is determined according to the selected deep reinforcement learning algorithm (Step S30).

Using the selected deep reinforcement learning algorithm, a policy that enables the autonomous vehicle to drive at the closest velocity to constant velocity is trained based on state information including the velocity of the autonomous vehicle and a relative velocity and a relative position between the autonomous vehicle and an observable vehicle by the autonomous vehicle at a preset time interval and reward information (step S40).

In an embodiment, in an environment in which one autonomous vehicle and a plurality of non-autonomous vehicles are driving on a roundabout, the autonomous vehicle can observe only a vehicle in front among the non-autonomous vehicles. Here, an action that the autonomous vehicle can take is acceleration, and a finite action space may be a set of real numbers from the minimum acceleration which is a negative real number to the maximum acceleration which is a positive real number.

The step S40 includes updating the deep neural network including the network and the target network based on the objective function for each algorithm according to the acquired state information, action information, reward information and next state information. The detailed learning process is presented in the algorithm 1 of FIG. 6.

Figure 17:
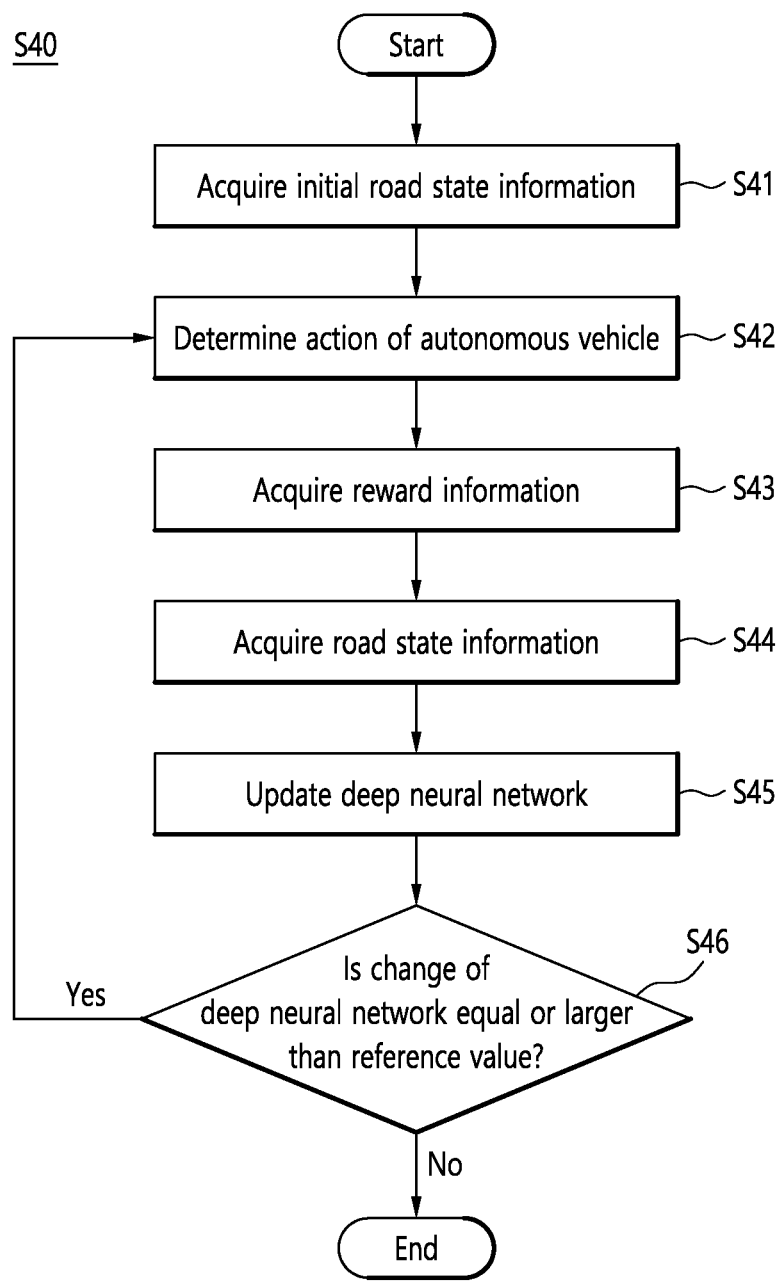
FIG. 17 is a flowchart of a policy learning step of FIG. 16.

Specifically, referring to FIG. 17, the step S40 includes acquiring state information, i.e., initial road state information using the selected deep reinforcement learning algorithm, the state information including the velocity of the autonomous vehicle and the relative velocity and the relative position between the autonomous vehicle and the observable vehicle by the autonomous vehicle at the preset time interval (Step S41).

The action of the autonomous vehicle according to the state information is determined (Step S42), and the reward information according to the action of the autonomous vehicle is acquired (Step S43). Subsequently, changed road state information is acquired according to the action of the autonomous vehicle (Step S44), and the deep neural network is updated based on the reward information (Step S45).

Subsequently, determination is made whether a change of the deep neural network is equal to or larger than a reference value (Step S46), when the change of the deep neural network is equal to or larger than the reference value, the learning of the policy is terminated, and when the change of the deep neural network is less than the reference value, the action of the autonomous vehicle is determined to continue the learning of the policy.

The autonomous vehicle drives based on the learned policy to determine the action of the autonomous vehicle (Step S50).

Figure 18:
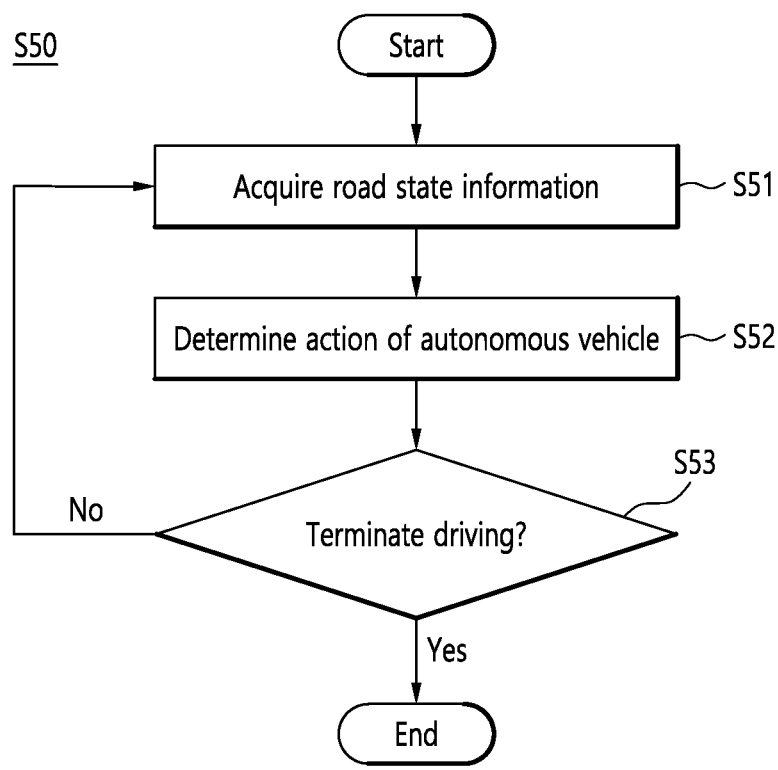
FIG. 18 is a flowchart of a learned policy based driving step of FIG. 16.

Referring to FIG. 18, the step S50 includes determining the action of the autonomous vehicle (Step S52) according to the acquired road state information (Step S51). Additionally, when there is a driving termination condition, driving is terminated (Step S53).

Hereinafter, the performance is evaluated for each deep reinforcement learning algorithm used in the autonomous vehicle. For example, driving performance evaluation and driving pattern analysis is performed on the autonomous vehicle trained using three algorithms of PPO, DDPG and TD3, and for quantitative performance evaluation of each algorithm, a change in accumulative mean reward of a single episode is plotted.

In an embodiment, TD3 which is closest to a constant acceleration motion, and accordingly has high energy efficiency with less deceleration and acceleration of the autonomous vehicle may be selected and applied.

The present disclosure may analyze the mitigation of stop-and-go waves in the roundabout and the driving pattern for each algorithm by training autonomous vehicles through the deep reinforcement learning algorithm. In the case of a network in which there are autonomous vehicles trained with the proposed MDP model, it is possible to effectively control stop-and-go waves when compared with a network composed only of non-autonomous vehicles.

The method for combating a stop-and-go wave problem using deep reinforcement learning based autonomous vehicles may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

The present disclosure improves traffic flows by mitigating stop-and-go waves that frequently occur in roundabouts using deep reinforcement learning algorithm based autonomous vehicles. Accordingly, it will be usefully applied to autonomous driving technology that is now being developed with the development of artificial intelligence technology.

DETAILED DESCRIPTION OF MAIN ELEMENTS

10: Device for combating a stop-and-go wave problem using deep reinforcement learning based autonomous vehicles
110: Reward function determination unit
130: Algorithm selection unit
150: Deep neural network architecture determination unit
170: Policy learning unit
190: Policy usage unit
171: First action determination unit
173: Reward information acquisition unit
175: First state information acquisition unit
177: Deep neural network update unit
191: Second state information acquisition unit
193: Second action determination unit
30: Vehicle controller
31: Routing controller
33: Base controller
35: RL controller
37: IDM controller

What is claimed is:

1. A method for combating a stop-and-go wave traffic problem using deep reinforcement learning based autonomous vehicles, the method comprising:
    selecting a deep reinforcement learning algorithm and a reward function for training an autonomous vehicle in a roundabout environment in which autonomous vehicles and non-autonomous vehicles are driving,
    wherein the selecting the deep reinforcement learning algorithm comprises:
        selecting the deep reinforcement learning algorithm from a plurality of deep reinforcement learning algorithms including Proximal Policy Optimization (PPO), Deep Deterministic Policy Gradient (DDPG), and Twin Delayed DDPG (TD3);

setting parameters for each of a simulator according to the selected deep reinforcement learning algorithm and the deep reinforcement learning algorithm; and initializing parameters for a deep neural network corresponding to the selected deep reinforcement learning algorithm;

determining a deep neural network architecture according to the selected deep reinforcement learning algorithm;

learning a policy enabling the autonomous vehicle to drive at a near constant velocity based on state information and reward information using the selected deep reinforcement learning algorithm, wherein the state information includes a velocity of the autonomous vehicle and a relative velocity and a relative position between the autonomous vehicle and an observable vehicle observable by the autonomous vehicle at each of a preset time interval; and driving the autonomous vehicle based on the learned policy to determine an action of the autonomous vehicle.

2. The method of claim 1, wherein the learning the policy enabling the autonomous vehicle to drive at the near constant velocity comprises:
acquiring the state information;
determining the action of the autonomous vehicle according to the state information;
acquiring the reward information according to the action of the autonomous vehicle;
acquiring changed state information according to the action of the autonomous vehicle; and
updating a deep neural network based on the reward information.

3. The method of claim 2, wherein the learning the policy enabling the autonomous vehicle to drive at the near constant velocity further comprises:
determining if a change of the deep neural network is equal to or larger than a reference value, and terminating the learning of the policy when the change of the deep neural network is equal to or larger than the reference value; and
determining the action of the autonomous vehicle to continue the learning of the policy when the change of the deep neural network is less than the reference value.

4. The method of claim 1, wherein the action of the autonomous vehicle is acceleration, and
wherein a finite action space is a set of real numbers from minimum acceleration which is a negative real number to maximum acceleration which is a positive real number.

5. The method of claim 1, wherein the reward function includes a reward term having a value as the autonomous vehicle moves closer to a target velocity and a penalty term using a difference between a preset threshold and an absolute value of acceleration of the autonomous vehicle.

6. The method of claim 1, wherein the learning the policy enabling the autonomous vehicle to drive at the near constant velocity comprises:
acquiring the state information of the autonomous vehicle at the each of the preset time interval;
selecting and executing the action of the autonomous vehicle m the acquired state information;
acquiring the reward information according to the executed action and next state information; and updating a deep neural network including a network and a target network based on an objective function for each of the plurality of algorithms according to the acquired state information, action information, the reward information, and the next state information.

7. The method of claim 1, wherein the driving the autonomous vehicle comprises:
acquiring the state information of the autonomous vehicle;
selecting the action of the autonomous vehicle according to the acquired state information; and
terminating the driving when a driving termination condition is met.

8. A non-transitory computer-readable storage medium having recorded thereon a computer program for performing a method for combating a stop-and-go wave traffic problem using deep reinforcement learning based autonomous vehicles, the method comprising:
selecting a deep reinforcement learning algorithm and a reward function for training an autonomous vehicle in a roundabout environment in which autonomous vehicles and non-autonomous vehicles are driving,
wherein the selecting the deep reinforcement learning algorithm comprises:
selecting the deep reinforcement learning algorithm from a plurality of deep reinforcement learning algorithms including Proximal Policy Optimization (PPO), Deep Deterministic Policy Gradient (DDPG), and Twin Delayed DDPG (TD3);
setting parameters for each of a simulator according to the selected deep reinforcement learning algorithm and the deep reinforcement learning algorithm; and
initializing parameters for a deep neural network corresponding to the selected deep reinforcement learning algorithm;
determining a deep neural network architecture according to the selected deep reinforcement learning algorithm;
learning a policy enabling the autonomous vehicle to drive at a near constant velocity based on state information and reward information using the selected deep reinforcement learning algorithm, wherein the state information includes a velocity of the autonomous vehicle and a relative velocity and a relative position between the autonomous vehicle and an observable vehicle observable by the autonomous vehicle at each of a preset time interval; and
driving the autonomous vehicle based on the learned policy to determine an action of the autonomous vehicle.

9. A device for combating a stop-and-go wave traffic problem using deep reinforcement learning based autonomous vehicles, the device comprising:
an algorithm selection unit configured to select a deep reinforcement learning algorithm for training an autonomous vehicle in a roundabout environment in which autonomous vehicles and non-autonomous vehicles are driving,
wherein the algorithm selection unit is further configured to select the deep reinforcement learning algorithm from a plurality of deep reinforcement learning algorithms including Proximal Policy Optimization (PPO), Deep Deterministic Policy Gradient (DDPG), and Twin Delayed DDPG (TD3), set parameters for each of a simulator according to the selected deep reinforcement learning algorithm and the deep reinforcement learning algorithm, and initialize parameters for a deep neural network corresponding to the selected deep reinforcement learning algorithm;

a reward function determination unit configured to determine a reward function for acquiring reward information according to an action of the autonomous vehicle executed in a specific state to train the autonomous vehicle;

a deep neural network architecture determination unit configured to determine a deep neural network architecture according to the selected deep reinforcement learning algorithm;

a policy learning unit configured to learn a policy enabling the autonomous vehicle to drive at a near constant velocity based on state information and the acquired reward information using the selected deep reinforcement learning algorithm, wherein the state information includes a velocity of the autonomous vehicle and a relative velocity and a relative position between the autonomous vehicle and an observable vehicle observable by the autonomous vehicle at each of a preset time interval; and a policy usage unit configured to drive the autonomous vehicle based on the learned policy to determine the action of the autonomous vehicle.

10. The device of claim 9, wherein the policy learning unit comprises:
a first action determination unit configured to acquire the state information and determine the action of the autonomous vehicle according to the state information;
a reward information acquisition unit configured to acquire the reward information according to the action of the autonomous vehicle;
a first state information acquisition unit configured to acquire changed state information according to the action of the autonomous vehicle; and
a deep neural network update unit configured to update a deep neural network based on the reward information.

11. The device of claim 10, wherein the policy learning unit is further configured to:
determine if a change of the deep neural network is equal to or larger than a reference value, and terminate the learning of the policy when the change of the deep neural network is equal to or larger than the reference value; and
determine the action of the autonomous vehicle to continue the learning of the policy when the change of the deep neural network is less than the reference value.

12. The device of claim 9, wherein the action of the autonomous vehicle is acceleration, and
wherein a finite action space is a set of real numbers from minimum acceleration which is a negative real number to maximum acceleration which is a positive real number.

13. The device of claim 9, wherein the reward function includes a reward term having a larger value as is the autonomous vehicle moves closer to a target velocity and a penalty term using a difference between a preset threshold and an absolute value of acceleration of the autonomous vehicle.

14. The device of claim 9, wherein the policy learning unit is further configured to determine a stochastic or deterministic policy indicating a distribution of actions that can be taken in the specific state to maximize future cumulative rewards.

15. The device of claim 9, wherein the policy usage unit comprises:
a first state information acquisition unit configured to acquire the state information of the autonomous vehicle; and
a first action determination unit configured to determine the action of the autonomous vehicle according to the acquired state information, and terminate the driving when a driving termination condition is met.

* * * * *